US008325671B2

(12) United States Patent
Li et al.

(10) Patent No.: US 8,325,671 B2
(45) Date of Patent: Dec. 4, 2012

(54) METHODS AND APPARATUS FOR IMPROVED UTILIZATION OF AIR LINK RESOURCES IN A WIRELESS COMMUNICATIONS SYSTEM INCLUDING A MULTI-ANTENNA ELEMENT BASE STATION

(75) Inventors: Junyi Li, Bedminster, NJ (US); Xinzhou Wu, Monmouth Junction, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 907 days.

(21) Appl. No.: 11/851,327

(22) Filed: Sep. 6, 2007

(65) Prior Publication Data

US 2009/0067382 A1 Mar. 12, 2009

(51) Int. Cl.
*H04W 4/00* (2009.01)
(52) U.S. Cl. ........................................ 370/330; 370/343
(58) Field of Classification Search .................. 370/203, 370/208, 280, 281, 321, 329, 330, 335, 336, 370/337, 343, 344; 455/522, 69, 127.1; 375/130, 375/147

See application file for complete search history.

(56) References Cited

U.S. PATENT DOCUMENTS

| | | | | | |
|---|---|---|---|---|---|
| 5,745,480 | A | * | 4/1998 | Behtash et al. | 370/252 |
| 5,933,421 | A | * | 8/1999 | Alamouti et al. | 370/330 |
| 6,331,974 | B1 | * | 12/2001 | Yang et al. | 370/342 |
| 6,822,998 | B1 | * | 11/2004 | Yun et al. | 375/130 |
| 6,870,808 | B1 | | 3/2005 | Liu et al. | |
| 7,020,110 | B2 | | 3/2006 | Walton et al. | |
| 7,508,798 | B2 | * | 3/2009 | Tong et al. | 370/337 |
| 2003/0128658 | A1 | * | 7/2003 | Walton et al. | 370/208 |
| 2003/0198209 | A1 | * | 10/2003 | Schwengler et al. | 370/342 |
| 2004/0120289 | A1 | * | 6/2004 | Hamalainen et al. | 370/335 |
| 2004/0203983 | A1 | * | 10/2004 | Klomsdorf et al. | 455/522 |

FOREIGN PATENT DOCUMENTS

| | | |
|---|---|---|
| EP | 1542419 A2 | 6/2005 |
| JP | 2004201296 | 7/2004 |
| WO | WO2007051181 | 5/2007 |
| WO | WO2007109679 | 9/2007 |

OTHER PUBLICATIONS

European Search Report—EP08006322—Search Authority—The Hague—Apr. 9, 2009.
International Search Report and Written Opinion—PCT/US2008/075519—ISA/EPO—Apr. 20, 2009.

* cited by examiner

*Primary Examiner* — Andrew Lai
(74) *Attorney, Agent, or Firm* — Sam Talpalatsky; Nicholas J. Pauley; Jonathan T. Velasco

(57) ABSTRACT

Methods and apparatus are described for improved utilization of air link resources. A base station includes at least one of a plurality of receive antenna elements and a plurality of transmit antenna elements for communicating with a wireless terminal. The base station generates channel estimation vectors corresponding to wireless terminals using the base station, where a generated channel estimation vector includes different elements corresponding to different base station antenna elements. The base station determines a level of orthogonality between pairs of channel estimation vectors corresponding to different wireless terminals. At least some of the segments to be assigned by the base station are substantially overlapping, e.g., the segments overlap fully or to a high degree. Wireless terminal pairs which have substantially orthogonal channel estimation vectors are matched and assigned to substantially overlapping segments, and the power level associated with the segments is controlled to be substantially the same.

76 Claims, 20 Drawing Sheets

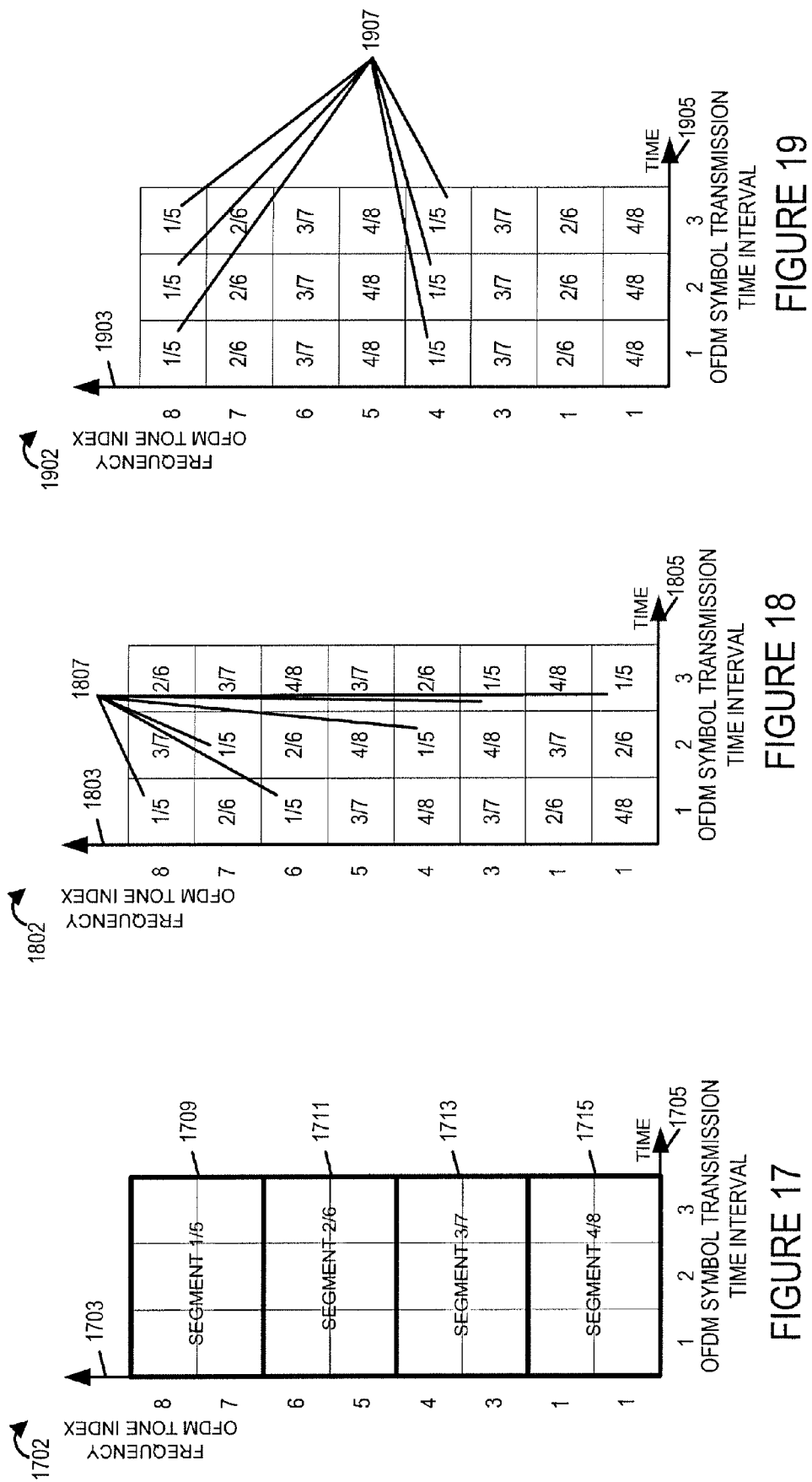

METHODS AND APPARATUS FOR IMPROVED UTILIZATION OF AIR LINK RESOURCES IN A WIRELESS COMMUNICATIONS SYSTEM INCLUDING A MULTI-ANTENNA ELEMENT BASE STATION

FIELD

Various embodiments relate to wireless communications methods and apparatus and, more particularly, to methods and apparatus for improving utilization of air link resources in a wireless communications system including a base station with multiple antenna elements.

BACKGROUND

In wireless communications systems with multiple antennas, e.g., OFDM-based cellular systems with multiple antennas, it is desirable to send multiple layers of data over the same frequency-time resource to fully utilize the spatial dimension introduced by multiple antennas. The different layers of data are not necessarily orthogonal to each other and thus weakens the orthogonally between different users in the OFDM-based systems. As an example, consider the uplink channel when Spatial Division Multiple-Access (SDMA) is used. In this scenario, the base station assigns multiple users to share the same time-frequency resource. However, in most scenarios, there is a non-zero correlation between the spatial signatures from these users. As a result, after spatial processing, one user will see part of the energy from other users as interference.

There is an SNR range problem when two wireless terminal users share the same uplink time-frequency resource. This problem is a direct outcome of the channel estimation error, i.e., the channel estimation error of the first user contributes to the interference plus noise term of the second user in the form of $|\tilde{h}_1|^2 P_1$, where $P_1$ is the transmit power of user 1 and $|\tilde{h}_1|^2$ is the estimation error of user 1. Hence, there is a certain correlation between the SNR ranges of these two users such that the SNR difference between these two users should not be too significant for such an approach to work satisfactorily. This is because if a first user transmits at a much larger targeted SNR as compared to a second user, then the received power of the first user is significantly higher than the received power of the second user, and as a result the interference caused by the estimation error, which is proportional to the received power of the first user, will make the decoding of the second user's codeword impossible or nearly impossible. Hence, for interfering users sharing the same uplink frequency-time resource, it is important that they operate at similar SNRs. The sharing of the same uplink time-frequency resource can be, and sometimes is, a partial overlap between segments. A segment is a set of time-frequency resource. Two segments overlap when the two segments have at least some of their time-frequency resource in common. The common time-frequency resource is sometimes called the overlapping portion. The criterion that users sharing the same time-frequency resource operate at similar SNRs is sometimes referred to as the SNR range criterion.

One known approach in wireless communications systems in which a base station communicates with multiple wireless terminals and uses multiple antennas to communicate with a wireless terminal involves the reuse of airlink resources as described in FIG. 1. In this example, each of the segments are of the same size, and the additional segment to be overlapped with the underlying time frequency structure segments is intentionally distributed in equal size portions among a significant number of underlying segments, e.g., four or more underlying segments. Different segments, which are assigned to different wireless terminals, will have different channel vectors. Different segments, which are assigned to different wireless terminals will typically have different dynamic ranges, e.g., different segments can have very different target power levels and/or very different target SNRs.

Drawing 100 is a graph illustrating frequency on the vertical axis 102 and time one the horizontal axis 104. Legend 106 which corresponds to drawing 100 indicates that: (i) segment 1 is identified by descending, from left to right, diagonal line shading as indicated by block 108; (ii) segment 2 is identified by ascending, from left to right, diagonal line shading, as indicated by block 110; (iii) segment 3 is identified by vertical line shading as indicated by block 113; (iv) segment 4 is identified by horizontal line shading as indicated by block 114; (v) segment 5 is identified by dotted shading as indicated by block 116. In drawing 100, it can be observed that segment 5 is contiguous and overlaps with ¼ of each of segments 1, 2, 3, and 4. In this example, segments 1 to 4 do not overlap with each other, while segment 5 overlaps with each of segments 1, 2, 3, and 4.

Drawing 150 is a graph illustrating frequency on the vertical axis 152 and time one the horizontal axis 154. Legend 156 which corresponds to drawing 150 indicates that: (i) segment 1 is identified by descending, from left to right, diagonal line shading as indicated by block 158; (ii) segment 2 is identified by ascending, from left to right, diagonal line shading, as indicated by block 160; (iii) segment 3 is identified by vertical line shading as indicated by block 162; (iv) segment 4 is identified by horizontal line shading as indicated by block 164; (v) segment 5 is identified by dotted shading as indicated by block 166. In drawing 150, it can be observed that segment 5 is non-contiguous and overlaps with ¼ of each of segments 1, 2, 3, and 4.

Consider the examples of FIG. 1 when the segments are being used for uplink signaling from different wireless terminals to a base station with multiple receive antenna elements. The SNR range criterion has to be applied between the user of segment 5 and each of users of segments 1, 2, 3, and 4. Assuming that one of users corresponding to segments 1, 2, 3 and 4 is operating at a low SNR while another one is operating at high SNR, we now have the dilemma that whatever the operating point of the segment 5 user, we will violate the SNR range criteria with one of users 1, 2, 3, and 4. This will lead to an almost always decoding error in one of the segments.

While known techniques allow some use of a resource by multiple devices, there is a need for improved methods and apparatus which allow multiple devices to share the same component resources. It is desirable for the channel vectors of an overlapping resource to be orthogonal from the perspective of reusing the resource in an environment with multiple base station antennas. It would be beneficial for overlapping segments to have the same power level and/or same SNR from the perspective of reusing the resource in an environment with multiple base station antennas. In addition, it would be advantageous if methods and apparatus supported a wide variation of dynamic range for users in the system, e.g., in terms of power levels and/or SNR.

BRIEF DESCRIPTION OF THE FIGURES

FIG. 17 is a drawing illustrating exemplary substantially overlapping segments in accordance with various embodiments.

FIG. 18 is a drawing illustrating exemplary substantially overlapping segments in accordance with various embodiments.

FIG. 19 is a drawing illustrating exemplary substantially overlapping segments in accordance with various embodiments.

SUMMARY

Figure 1:
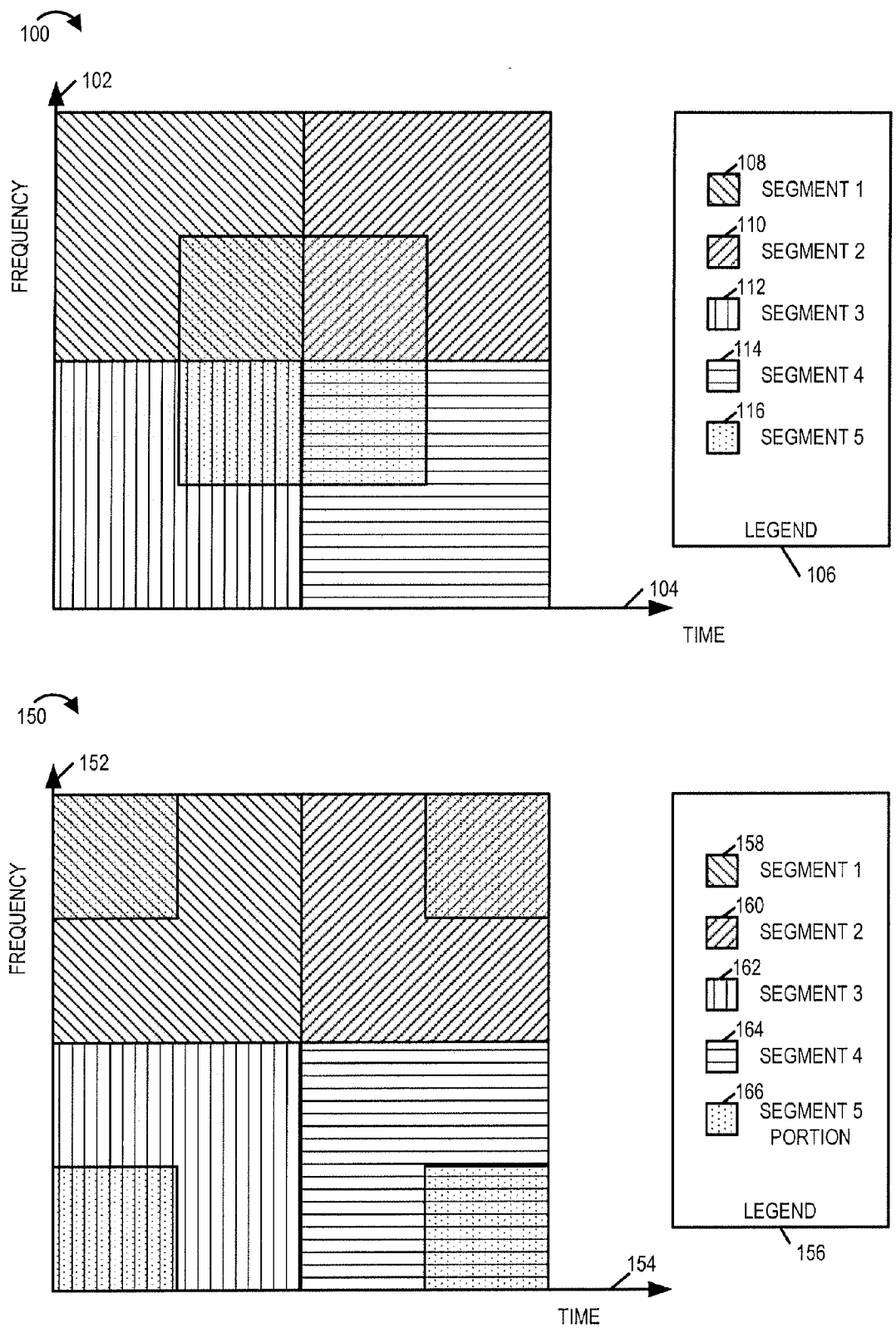
FIG. 1 is a drawing of a known approach of air link resource reuse in a multiple antenna element base station configuration.

Methods and apparatus for improved utilization of air link resources are described. In some, but not necessarily all embodiments a base station includes at least one of a plurality of receive antenna elements and a plurality of transmit antenna elements for communicating with a wireless terminal. The base station generates channel estimation vectors corresponding to wireless terminals using the base station, where a generated channel estimation vector includes different elements corresponding to different base station antenna elements. The base station determines a level of orthogonality between pairs of channel estimation vectors corresponding to different wireless terminals. In various embodiments at least some of the segments to be assigned by the base station are substantially overlapping in time and frequency, e.g., the segments overlap fully or to a high degree. Wireless terminal pairs which have substantially orthogonal channel estimation vectors may, and in some embodiments are, matched and assigned to substantially overlapping segments. In various embodiments the power level and/or SNR associated with the segments is controlled to be substantially the same.

One exemplary method of operating a base station including multiple antenna elements for use with a plurality of wireless terminals includes selecting first and second wireless terminals, from a plurality of wireless terminals based on first and second channel estimate vectors corresponding to said first and second wireless terminals, respectively. In one such exemplary embodiment each of said first and second channel estimate vectors includes channel information corresponding to different ones of said multiple antenna elements. In the exemplary method, the base station transmits assignment information to the selected first and second wireless terminals with the selected first and second wireless terminals being assigned first and second segments, respectively. In some embodiments the assigned first and second segments include communications resources which at least substantially overlap. An exemplary base station, in accordance with one exemplary embodiment, includes multiple antenna elements for communicating with a wireless terminal and a selection module for selecting first and second wireless terminals, from a plurality of wireless terminals, based on first and second channel estimate vectors corresponding to said first and second wireless terminals, respectively. In one but not necessarily all embodiments, each of said first and second channel estimate vectors include channel information corresponding to different ones of said multiple antenna elements. The base station may, and in some embodiments does, also include a transmission module for transmitting assignment information to the selected first and second wireless terminals. The selected first and second wireless terminals are terminals which have been assigned first and second segments, respectively, where said first and second segments including communications resources which at least substantially overlap.

While various embodiments have been discussed in the summary above, it should be appreciated that not necessarily all embodiments include the same features and some of the features described above are not necessary but can be desirable in some embodiments. Accordingly, all the features discussed above should not be interpreted as being required in each embodiment of the invention. Numerous additional features, embodiments and benefits are discussed in the detailed description which follows.

DETAILED DESCRIPTION

Figure 2:
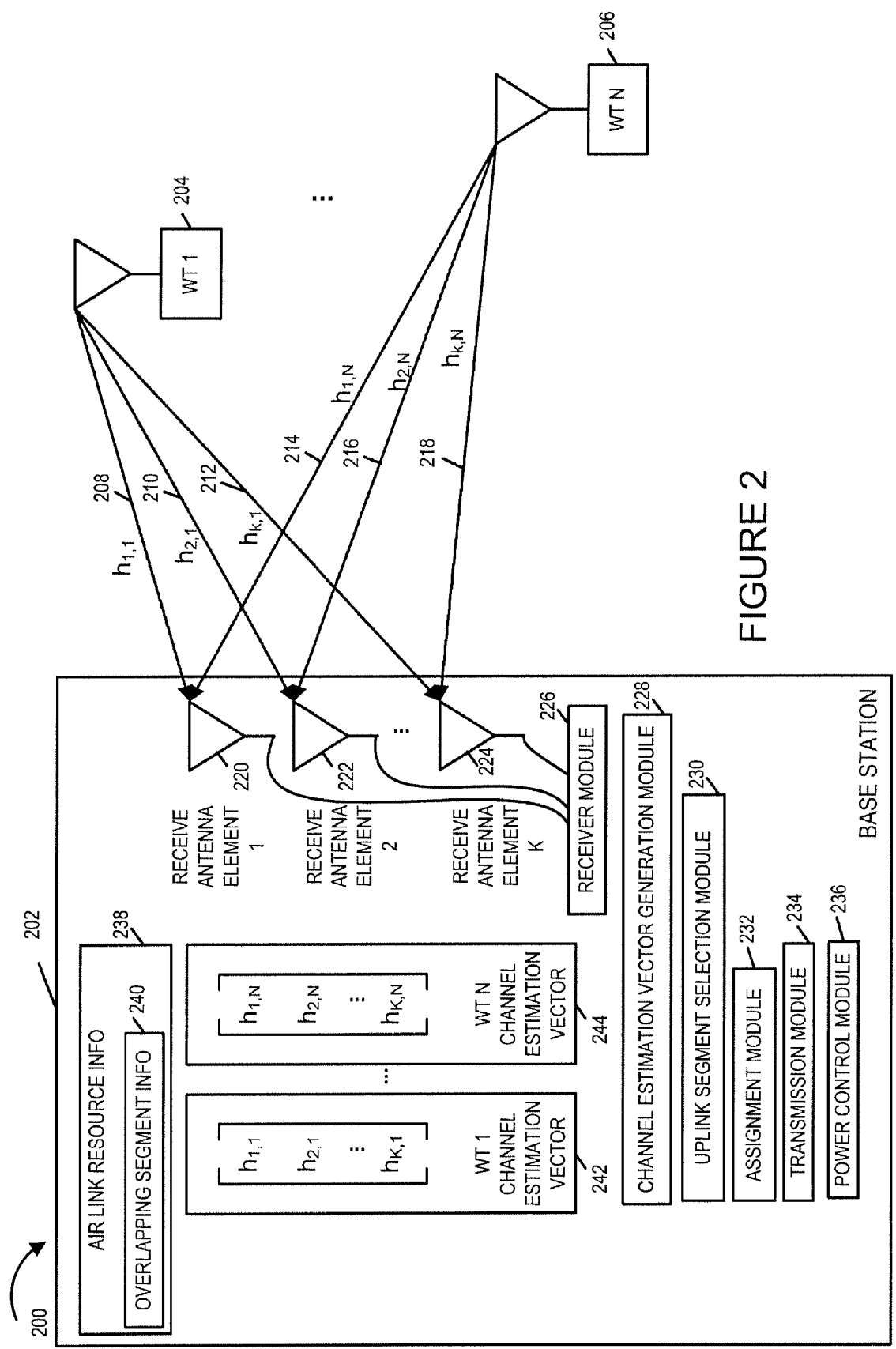
FIG. 2 is a drawing of an exemplary multiple access wireless communications system in which a base station uses multiple antenna elements to receive uplinks signals from a wireless terminal, in accordance with various embodiments.

FIG. 2 is a drawing of an exemplary multiple access wireless communications system 200 in which a base station uses multiple receive antenna elements to receive uplinks signals from a wireless terminal, in accordance with various embodiments. In some embodiments, the system 200 includes a plurality of base stations which are coupled together via a backhaul network. Exemplary wireless communications system 200 includes a base station 202 and a plurality of wireless terminals (WT 1 204, ... WTN 206). Exemplary base station 202 includes a plurality of receive antenna elements (receive antenna element 1 220, receive antenna element 2 222, ..., receive antenna element k 224). WT 1 204 is coupled to antenna elements (220, 222, ..., 224) of base station 202 via wireless communications links (208, 210, 212), respectively, having channel values ($h_{1,1}, h_{2,1}, \ldots, h_{k,1}$), respectively. WT N 206 is coupled to antenna elements (220, 222, ..., 224) of base station 202 via wireless communications links (214, 216, ..., 218), respectively, having channel values ($h_{1,N}, h_{2,N}, \ldots, h_{k,N}$), respectively. Base station 202 includes a receiver module 226, a channel estimation vector generation module 228, an uplink segment selection module 230, an assignment module 232, a transmission module 234, and a power control module 236. Base station 202 also includes air link resource information 238 and channel estimation vector information (WT 1 channel estimation vector 242, ..., WT N channel estimation vector 244). The air link resource information 238 includes information corresponding to a plurality of uplink segments. At least some of the uplink segments substantially overlap other uplink segments, and overlapping segment information 240 identifies the overlapping segments, the areas of overlap, and criteria pertaining to assignment of overlapping resources, e.g., channel condition constraints and/or receive power constraints.

Receiver module 226 is coupled to the antenna elements (220, 222, ..., 224) and receives uplink signal from wireless terminals. At least some of the received uplink signals are communicated from different wireless terminals using the same air link resources. For example, two uplink traffic channel segments, in some embodiments, occupy a common set of OFDM tone-symbols. Channel estimation vector generation module 228, which is coupled to receiver module 226, measures received signals and generates channel estimation vectors corresponding to different wireless terminals (WT 1 channel estimation vector 242, ..., WT N channel estimation vector 244). Different elements of a generated channel estimation vector correspond to different receive antenna elements. Uplink segment selection module 230 selects which wireless terminals are to be assigned which uplink segments. With regard to overlapping segments, the uplink segment selection module 230 uses the channel estimation information to select wireless terminals which have substantially orthogonal channel estimation vectors, e.g., cross correlation coefficient value magnitude less than 0.2. The assignment module 232 generates assignment signals to convey assignment information including assignment corresponding to overlapping segments. The transmission module 234 transmits downlink signals to the wireless terminals including generated assignment signals. The power control module 236 controls the received power level of wireless terminal uplink signals, e.g., controlling the received power of overlapping uplink segments to have substantially the same received power, e.g. within 3 dBs. In some embodiments, generated power control information for an assigned segment is included in the assignment signal.

Figure 3:
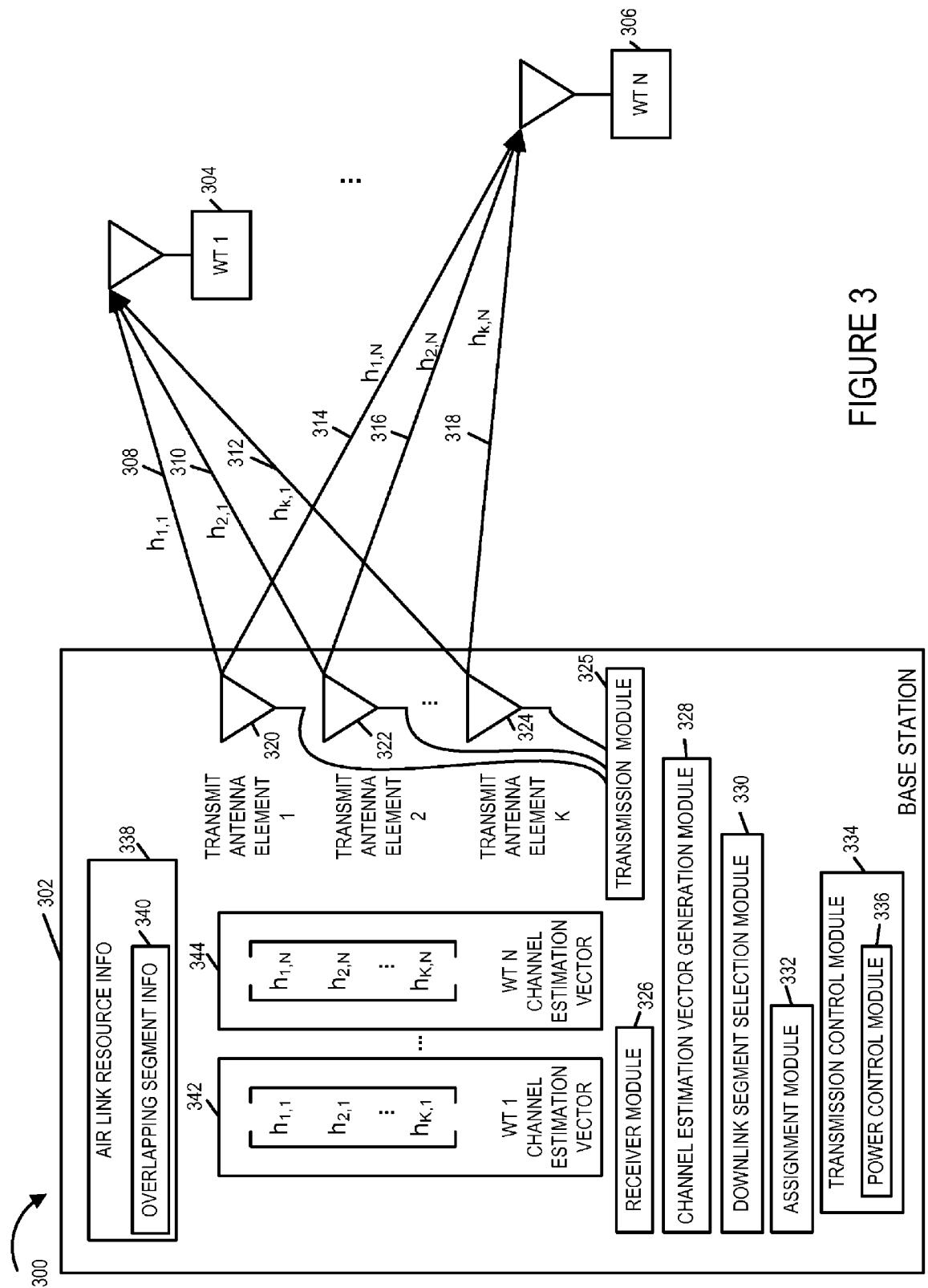
FIG. 3 is a drawing of an exemplary multiple access wireless communications system in which a base station uses multiple transmit elements to transmit downlink signals to a wireless terminal, in accordance with various embodiments.

FIG. 3 is a drawing of an exemplary multiple access wireless communications system 300 in which a base station uses multiple transmit elements to transmit downlink signals to a wireless terminal, in accordance with various embodiments. In some embodiments, the system 300 includes a plurality of base stations which are coupled together via a backhaul network. Exemplary wireless communications system 300 includes a base station 302 and a plurality of wireless terminals (WT 1 304, ... WTN 306). Exemplary base station 302 includes a plurality of transmit antenna elements (transmit antenna element 1 320, transmit antenna element 2 322, ..., transmit antenna element k 324). WT 1 304 is coupled to antenna elements (320, 322, ..., 324) of base station 302 via wireless communications links (308, 310, ..., 312), respectively, having channel values ($h_{1,1}, h_{2,1}, \ldots, h_{k,1}$), respectively. WT N 306 is coupled to antenna elements (320, 322, ..., 324) of base station 302 via wireless communications links (314, 316, ..., 318), respectively, having channel values ($h_{1,N}, h_{2,N}, \ldots, h_{k,N}$), respectively. Base station 302 includes a transmission module 325, a receiver module 326, a channel estimation vector generation module 328, a downlink segment selection module 330, an assignment module 332, and a transmission control module 334 which includes a power control module 336. Base station 302 also includes air link resource information 338 and channel estimation vector information (WT 1 channel estimation vector 342, ..., WT N channel estimation vector 344). The air link resource information 338 includes information corresponding to a plurality of downlink segments. At least some of the downlink segments substantially overlap other downlink segments, and overlapping segment information 340 identifies the overlapping segments, the areas of overlap, and criteria pertaining to assignment of overlapping resources, e.g., channel condition constraints and/or transmit power constraints.

Receiver module 326 is coupled to a receive antenna element or elements and receives uplink signal from wireless terminals. Some received uplink signals include information conveying channel condition information, e.g., feedback reports and/or channel vector information. The received channel condition information is used by the channel estimation vector generation module 328, to generate channel estimation vectors corresponding to different wireless terminals (WT 1 channel estimation vector 342, ..., WT N channel estimation vector 344). Different elements of a generated channel estimation vector correspond to different transmit antenna elements.

At least some of the transmitted downlink signals are communicated to different wireless terminals using the same air link resources. For example, two downlink traffic channel segments, in some embodiments, occupy a common set of OFDM tone-symbols in a recurring time-frequency structure. Downlink segment selection module 330 selects which wireless terminals are to be assigned which downlink segments. With regard to overlapping segments, the downlink segment selection module 330 uses the channel estimation information to select wireless terminals which have substantially orthogonal channel estimation vectors, e.g., cross correlation coefficient value magnitudes less than 0.2. The assignment module 332 generates assignment signals to convey assignment information including assignments corresponding to overlapping segments. The transmission module 335, which is coupled to transmit antenna elements (320, 322, ..., 324) transmits downlink signals to the wireless terminals including generated assignment signals and traffic channel segment signals. The transmission control module 334 control the operation of the transmission module 325. The transmission control module 334 includes power control module 336 which controls the transmission power level of downlink signals, e.g., controlling the transmission power of overlapping downlink segments to have substantially the same transmission power level, e.g. within 3 dBs.

Figure 4:
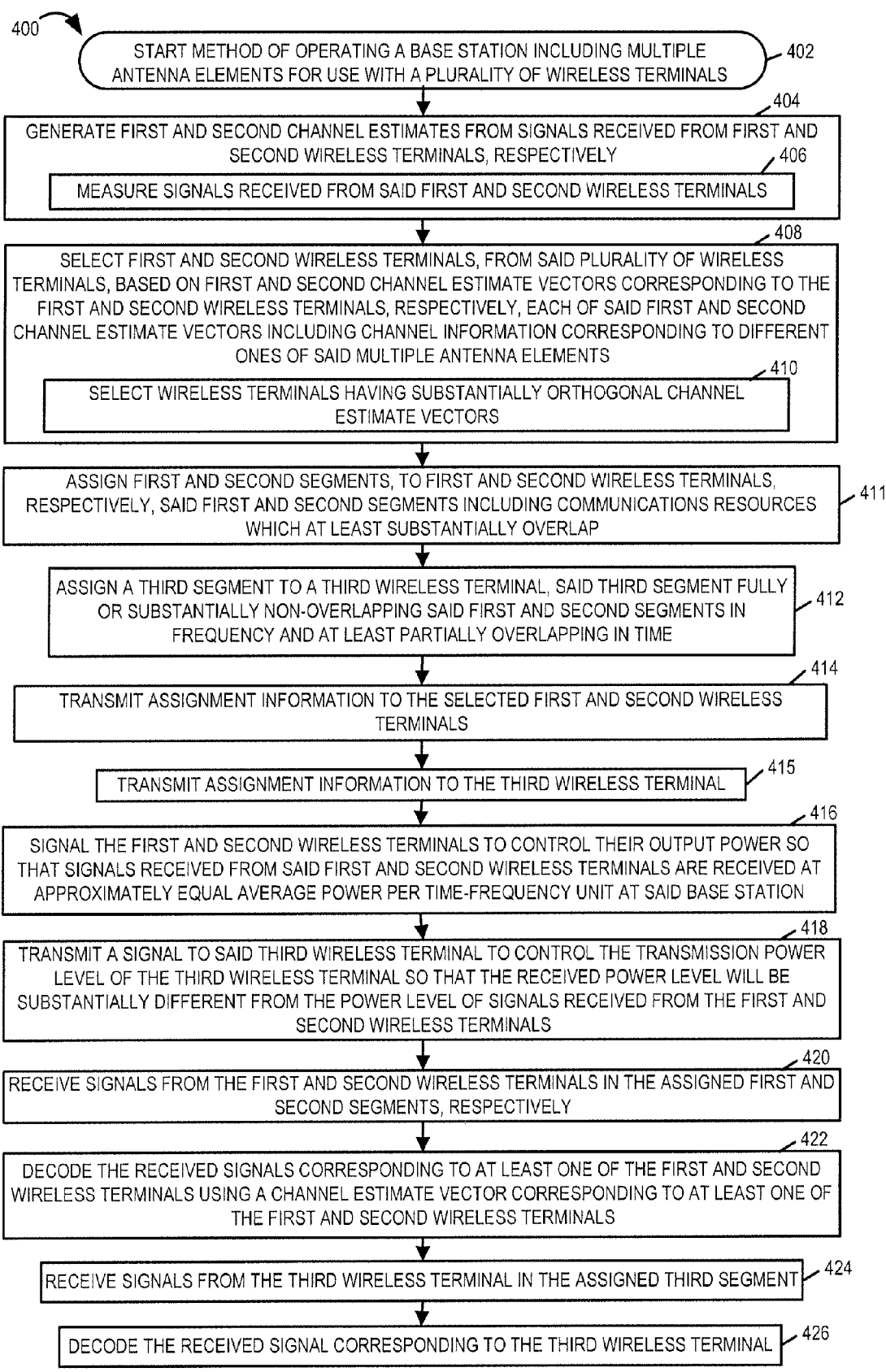
FIG. 4 is a drawing of a flowchart of an exemplary method of operating a base station including multiple receive antenna elements for use with a plurality of wireless terminals.

FIG. 4 is a drawing of a flowchart 400 of an exemplary method of operating a base station including multiple antenna elements for use with a plurality of wireless terminals. Operation starts in step 402, where the base station is powered on and initialized and proceeds from step 402 to step 404.

In step 404, the base station generates first and second channel estimates from signals received from first and second wireless terminals, respectively. Step 404 includes sub-step 406, in which the base station measures signals received from the first and second wireless terminals. Operation proceeds from step 404 to step 408.

In step 408, the base station selects first and second wireless terminals, from said plurality of wireless terminals, based on the first and second channel estimate vectors corresponding to the first and second wireless terminals, respectively, each of said first and second channel estimate vectors including channel information corresponding to different ones of said multiple antenna elements. Step 408 includes sub-step 410. In sub-step 410, the base station selects wireless terminals having substantially orthogonal channel estimate vectors. In some embodiments substantially orthogonal channel estimate vectors have a cross correlation coefficient having a magnitude less than 0.2. Operation proceeds from step 408 to step 411.

In step 411, the base station assigns first and second segments to first and second wireless terminals, respectively, said first and second segments including communications resources which at least substantially overlap. In various embodiments, the first and second segments are sets of time-frequency resource units. In some embodiments, at least 50% of the time-frequency resource units included in one of the first and second segments is included in the other of the first and second segments. In some embodiments, 100% of the time-frequency resource units included in one of the first and second segments is included in the other of the first and second segments. In some embodiments, the first and second segments include the same number of time-frequency resource units. Operation proceeds from step 411 to step 412.

In step 412, the base station assigns a third segment to a third wireless terminal, said third segment fully or substantially non-overlapping said first and second segments in frequency and at least partially overlapping in time. Operation proceeds from step 412 to step 414.

In step 414, the base station transmits assignment information to the selected first and second wireless terminals being assigned first and second segments, and in step 415 the base station transmits assignment information to the third wireless terminal. Operation proceeds from step 415 to step 416, in which the base station signals the first and second wireless terminals to control their output power so that signals received from said first and second wireless terminals are received at approximately equal average power per time-frequency unit at said base station, and in step 418 the base station transmits a signal to the third wireless terminal to control the transmission power level of the third wireless terminal so that the received power level of the third wireless terminal will be substantially different from the power level of the signals received from the first and second wireless terminals. In some embodiments, the signals received from the first and second wireless terminals are received within received power levels within 3 dBs of each other. In various embodiments, the received power level difference between the received power level of the third wireless terminal and the received power level of signals from first and second wireless terminals is at least 5 dBs.

Then, in step 420, the base station receives signals from the first and second wireless terminals in the assigned first and second segments, respectively. Next, in step 422, the base station decodes the received signals corresponding to at least one of the first and second wireless terminals using a channel estimate vector corresponding to at least one of the first and second wireless terminals. Operation proceeds from step 422 to step 424. In step 424 the base station receives signals from the third wireless terminal in the assigned third segment, and then in step 426, the base station decodes the received signal corresponding to the third wireless terminal.

In some embodiments, the base station, first wireless terminal, second wireless terminal and third wireless terminal are part of a multiple access OFDM wireless communications system, and the base station uses multiple antenna elements to receive signals from a wireless terminal. In some such embodiments, the first, second and third segments are uplink traffic channel segments in a recurring timing and frequency structure. In various embodiments, the first, second and third segments include set of time-frequency units which are OFDM tone-symbols. In some such embodiments, in terms of OFDM tone-symbols, the first and second segments are fully overlapping segments, and the third segment is a non-overlapping segment with respect to both of the first and second segments.

In some embodiments, as an alternative to step 416, the base station signals the first and second wireless terminals to control their output power so that signals from the first and second wireless terminals, with regard to the first and second segments, are received at the base station at approximately equal signal to noise ratios, e.g., within 3 dBs of each other. In some such embodiments, as an alternative to step 418, the base station transmits a signal to said third wireless terminal to control the transmission power level of the third wireless terminal so that the received signal from the third wireless terminal, with regard to the third segment, will be received at the base station having an SNR which is substantially different from the SNRs corresponding to the first and second segment signals from the first and second wireless terminals, e.g., at least 5 dBs different.

In some embodiments, as another alternative to step 416, the base station signals the first and second wireless terminals to control their output data rate so that signals from the first and second wireless terminals, with regard to the first and second segments, are received at the base station at approximately equal signal to noise ratios, e.g., within 3 dBs of each other. In some such embodiments, as an alternative to step 418, the base station transmits a signal to said third wireless terminal to control the output data rate of the third wireless terminal so that the received signal from the third wireless terminal, with regard to the third segment, will be received at the base station having an SNR which is substantially different from the SNRs corresponding to the first and second segment signals from the first and second wireless terminals, e.g., at least 5 dBs different.

Figure 5:
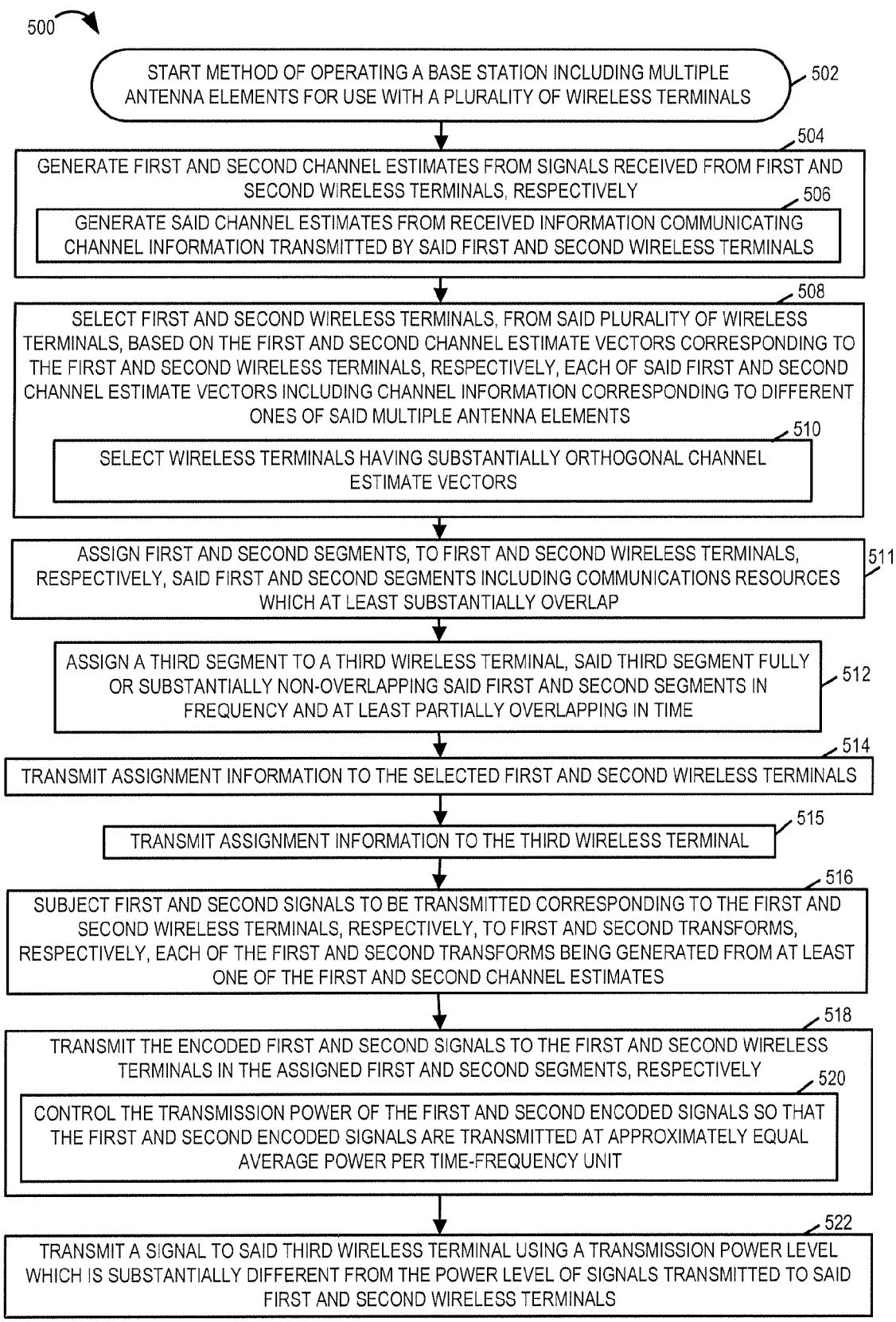
FIG. 5 is a drawing of a flowchart of an exemplary method of operating a base station including multiple transmit antenna elements for use with a plurality of wireless terminals.

FIG. 5 is a drawing of a flowchart 500 of an exemplary method of operating a base station including multiple antenna elements for use with a plurality of wireless terminals. Operation starts in step 502, where the base station is powered on and initialized and proceeds from step 502 to step 504.

In step 504, the base station generates first and second channel estimates from signals received from the first and second wireless terminals, respectively. Step 504 includes sub-step 506, in which the base station generates said channel estimates from received information communicating channel information transmitted by said first and second wireless terminals. Operation proceeds from step 504 to step 508.

In step 508, the base station selects first and second wireless terminals, from said plurality of wireless terminals, based on the first and second channel estimate vectors corresponding to the first and second wireless terminals, respectively, each of said first and second channel estimate vectors including channel information corresponding to different ones of said multiple antenna elements. Step 508 includes sub-step 510. In sub-step 510, the base station selects wireless terminals having substantially orthogonal channel estimate vectors. In some embodiments substantially orthogonal channel estimate vectors have a cross correlation coefficient having a magnitude less than 0.2. Operation proceeds from step 508 to step 511.

In step 511, the base station assigns first and second segments, to first and second wireless terminals, respectively, said first and second segments including communications resources which at least substantially overlap. In various embodiments, the first and second segments are sets of time-frequency resource units. In some embodiments, at least 50% of the time-frequency resource units included in one of the first and second segments is included in the other or the first and second segments. In some embodiments, 100% of the time-frequency resource units included in one of the first and second segments is included in the other or the first and second segments. In some embodiments, the first and second segments include the same number of time-frequency resource units. Operation proceeds from step 511 to step 512. In step 512, the base station assigns a third segment to a third wireless terminal, said third segment fully or substantially non-overlapping said first and second segments in frequency and at least partially overlapping in time. Operation proceeds from step 512 to step 514.

In step 514, the base station transmits assignment information to the selected first and second wireless terminals being assigned first and second segments, respectively, and in step 515 the base station transmits assignment information to the third wireless terminal. Operation proceeds from step 515 to step 516. In step 516, the base station subjects first and second signals to be transmitted corresponding to the first and second wireless terminals, respectively, to first and second transforms, respectively, each of the first and second transforms being generated from at least one of the first and second channel estimates. Operation proceeds from step 516 to step 518.

In step 518, the base station transmits the encoded first and second signals to the first and second wireless terminals in the assigned first and second segments, respectively. Step 518 includes sub-step 520. In sub-step 520, the base station controls the transmission power of the first and second encoded signals so that the first and second encoded signals are transmitted at approximately equal power per time-frequency unit. In some embodiments, the first and second encoded signals to the first and second wireless terminals, respectively, are transmitted at power levels within 3 dBs of each other. Operation proceeds from step 518 to step 522. In step 522, the base station transmits a signal to said third wireless terminal using a transmission power level which is substantially different from the power level of signals transmitted to said first and second wireless terminals. In some embodiments, the transmitted power level difference is at least 5 dBs.

In some embodiments, the base station, first wireless terminal, second wireless terminal and third wireless terminal are part of an OFDM wireless communications system, and the base station uses multiple antenna elements to transmit signals to a wireless terminal. In some such embodiments, the first, second and third segments are downlink traffic channel segments in a recurring timing and frequency structure. In various embodiments, the first, second and third segments include sets of time-frequency units which are OFDM tone-symbols. In some such embodiments, in terms of OFDM tone-symbols, the first and second segments are fully overlapping segments with respect to each other, and the third segment is a non-overlapping segment with respect to both of the first and second segments.

Figure 6:
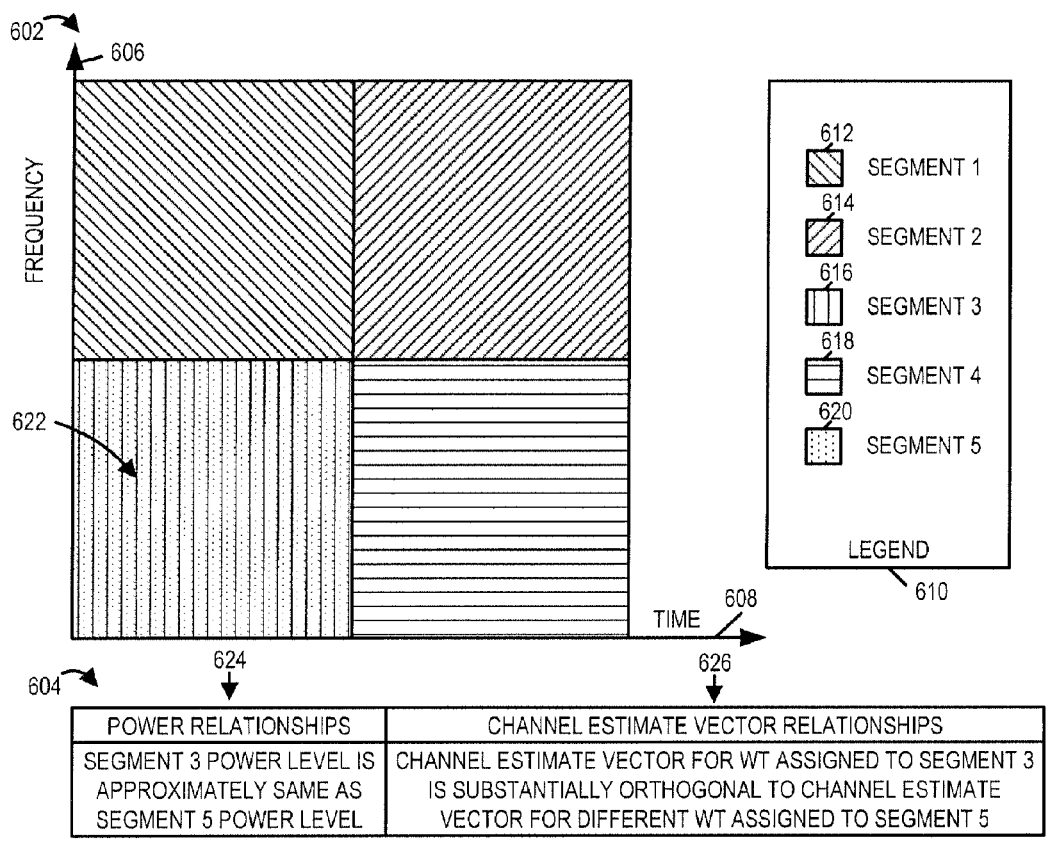
FIG. 6 includes a drawing of exemplary air link resources including exemplary overlapping segments in which two segments fully overlap and a table of corresponding constraint information, in accordance with various embodiments.

FIG. 6 includes a drawing 602 of exemplary air link resources including exemplary overlapping segments in which two segments fully overlap and a table 604 of corresponding constraint information, in accordance with various embodiments. Drawing 602 plots frequency on the vertical axis 606 vs time on the horizontal axis 608. Legend 610, also included in FIG. 6, includes: (i) sample pattern identification block 612 which identifies that segment 1 is represented by descending diagonal line shading from left to right; (ii) sample pattern identification block 614 which identifies that segment 2 is represented by ascending diagonal line shading from left to right; (iii) sample pattern identification block 616 which identifies that segment 3 is represented by vertical line shading; (iv) sample pattern identification block 618 which identifies that segment 4 is represented by horizontal line shading; (v) sample pattern identification block 620 which identifies that segment 5 is represented by dotted shading.

In drawing 602 it may be observed that segments 3 and 5 fully overlap in the time frequency region 622, e.g., segments 3 and 5 each include the same OFDM tone-symbols. Table 604 identifies exemplary power and channel estimate vector relationships corresponding to the example of drawing 602. First column 624 indicates that the segment 3 power level is controlled to be approximately the same as the segment 5 power level, e.g., within 3 dBs. If the segments are uplink segments, then the power level is the received power level at the base station. If the segments are downlink segments, then the power level is the transmit power level at the base station. Second column 626 indicates that the channel estimate vector for the wireless terminal assigned to segment 3 is substantially orthogonal to the channel estimate vector for a different wireless terminal assigned to segment 5, e.g., cross correlation coefficient magnitude less than 0.2.

Figure 7:
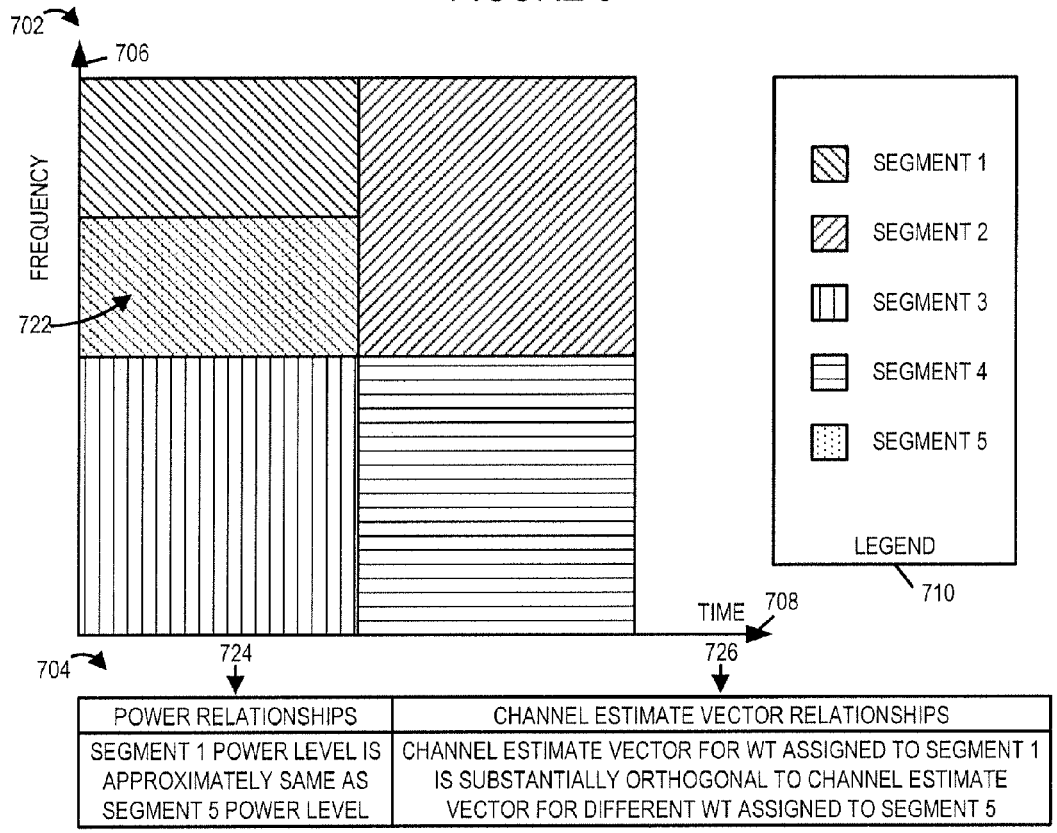
FIG. 7 includes a drawing of exemplary air link resources including exemplary overlapping segments, wherein two segments substantially overlap and a table of corresponding constraint information, in accordance with various embodiments.

FIG. 7 includes a drawing 702 of exemplary air link resources including exemplary overlapping segments, wherein two segments substantially overlap and a table 704 of corresponding constraint information, in accordance with various embodiments. Drawing 702 plots frequency on the vertical axis 706 vs time on the horizontal axis 708. Legend 710, also included in FIG. 7, includes: (i) sample pattern identification block 712 which identifies that segment 1 is represented by descending diagonal line shading from left to right; (ii) sample pattern identification block 714 which identifies that segment 2 is represented by ascending diagonal line shading from left to right; (iii) sample pattern identification block 716 which identifies that segment 3 is represented by vertical line shading; (iv) sample pattern identification block 718 which identifies that segment 4 is represented by horizontal line shading; (v) sample pattern identification block 720 which identifies that segment 5 is represented by dotted shading.

In drawing 702 it may be observed that segment 5 is smaller than segment 1 and segment 5 is fully included in the time frequency region corresponding to segment 1. Time frequency region 722 corresponds to the overlap region. Table 704 identifies exemplary power and channel estimate vector relationships corresponding to the example of drawing 702. First column 724 indicates that the segment 1 power level is controlled to be approximately the same as the segment 5 power level, e.g., within 3 dBs. If the segments are uplink segments, then the power level is the received power level at the base station. If the segments are downlink segments, then the power level is the transmit power level at the base station. Second column 726 indicates that the channel estimate vector for the wireless terminal assigned to segment 1 is substantially orthogonal to the channel estimate vector for a different wireless terminal assigned to segment 5, e.g., cross correlation coefficient magnitude less than 0.2.

Figure 8:
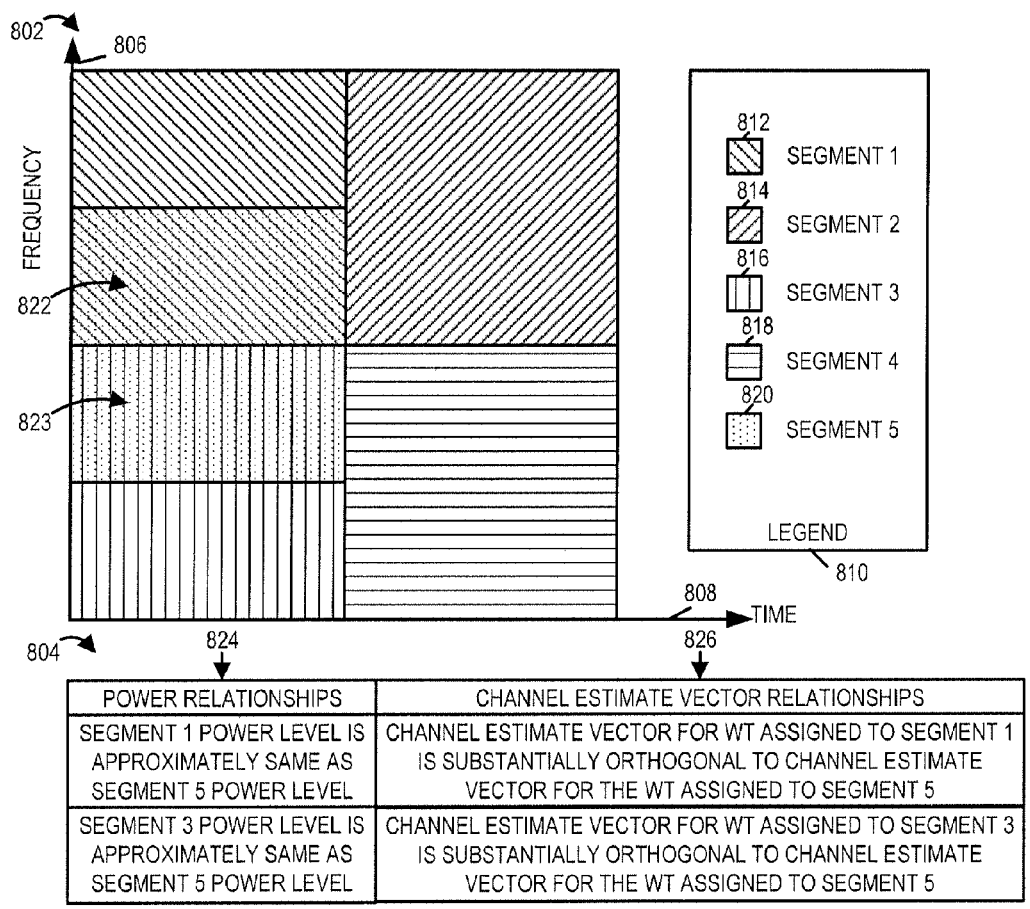
FIG. 8 includes a drawing of exemplary air link resources including exemplary overlapping segments, wherein one segment substantially overlap with two other segments and a table of corresponding constraint information, in accordance with various embodiments.

FIG. 8 includes a drawing 802 of exemplary air link resources including exemplary overlapping segments, wherein one segment substantially overlap with two other segments and a table 804 of corresponding constraint information, in accordance with various embodiments. Drawing 802 plots frequency on the vertical axis 806 vs time on the horizontal axis 808. Legend 810, also included in FIG. 8, includes: (i) sample pattern identification block 812 which identifies that segment 1 is represented by descending diagonal line shading from left to right; (ii) sample pattern identification block 814 which identifies that segment 2 is represented by ascending diagonal line shading from left to right; (iii) sample pattern identification block 816 which identifies that segment 3 is represented by vertical line shading; (iv) sample pattern identification block 818 which identifies that segment 4 is represented by horizontal line shading; (v) sample pattern identification block 820 which identifies that segment 5 is represented by dotted shading.

In drawing 802 it may be observed that segment 5 has 50% overlap with segment 1 and segment 5 has 50% overlap with segment 3. Time frequency region 822 corresponds to the overlap region between segments 1 and 5, while time frequency region 823 corresponds to the overlap region between segments 3 and 5. Table 804 identifies exemplary power and channel estimate vector relationships corresponding to the example of drawing 802. First column 824 indicates that the segment 1 power level is controlled to be approximately the same as the segment 5 power level, e.g., within 3 dBs. First column 824 also indicates that the segment 3 power level is controlled to be approximately the same as the segment 5 power level. If the segments are uplink segments, then the power level is the received power level at the base station. If the segments are downlink segments, then the power level is the transmit power level at the base station. Second column 826 indicates that the channel estimate vector for the wireless terminal assigned to segment 1 is substantially orthogonal to the channel estimate vector for the wireless terminal assigned to segment 5, e.g., cross correlation coefficient magnitude less than 0.2. Second column 826 also indicates that the channel estimate vector for the wireless terminal assigned to segment 3 is substantially orthogonal to the channel estimate vector for the wireless terminal assigned to segment 5, e.g., cross correlation coefficient magnitude less than 0.2.

Figure 9:
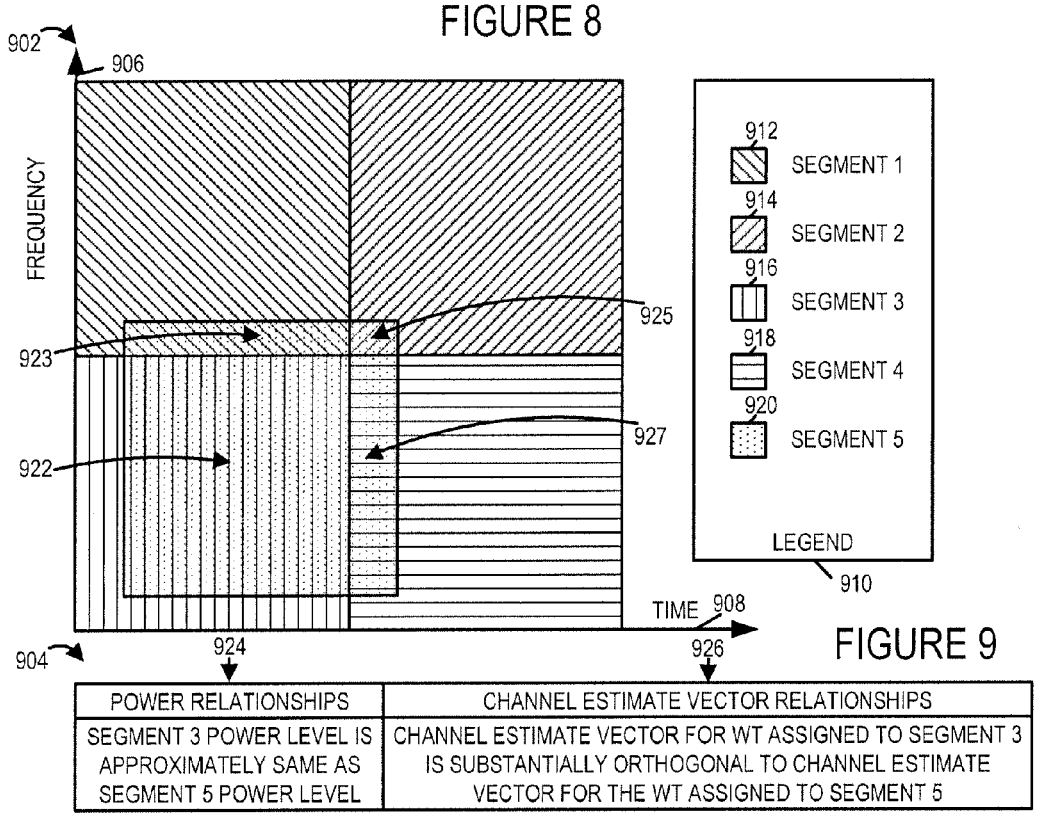
FIG. 9 includes a drawing of exemplary air link resources including exemplary overlapping segments in which two segments substantially overlap and a table of corresponding constraint information, in accordance with various embodiments.

FIG. 9 includes a drawing 902 of exemplary air link resources including exemplary overlapping segments in which two segments substantially overlap and a table 904 of corresponding constraint information, in accordance with various embodiments. Drawing 902 plots frequency on the vertical axis 906 vs time on the horizontal axis 908. Legend 910, also included in FIG. 9, includes: (i) sample pattern identification block 912 which identifies that segment 1 is represented by descending diagonal line shading from left to right; (ii) sample pattern identification block 914 which identifies that segment 2 is represented by ascending diagonal line shading from left to right; (iii) sample pattern identification block 916 which identifies that segment 3 is represented by vertical line shading; (iv) sample pattern identification block 918 which identifies that segment 4 is represented by horizontal line shading; (v) sample pattern identification block 920 which identifies that segment 5 is represented by dotted shading.

In drawing 902 it may be observed that segments 3 and 5 substantially overlap in the time frequency region 922. Segments 1 and 5 have some overlap but it is non-substantial (see region 923). Segments 2 and 5 have some overlap but it is non-substantial (see region 925). Segments 4 and 5 have some overlap but it is non-substantial (see region 927). Table 904 identifies exemplary power and channel estimate vector relationships corresponding to the example of drawing 902. First column 924 indicates that the segment 3 power level is controlled to be approximately the same as the segment 5 power level, e.g., within 3 dBs. If the segments are uplink segments, then the power level is the received power level at the base station. If the segments are downlink segments, then the power level is the transmit power level at the base station. Second column 926 indicates that the channel estimate vector for the wireless terminal assigned to segment 3 is substantially orthogonal to the channel estimate vector for a different wireless terminal assigned to segment 5, e.g., cross correlation coefficient magnitude less than 0.2.

Figure 10:
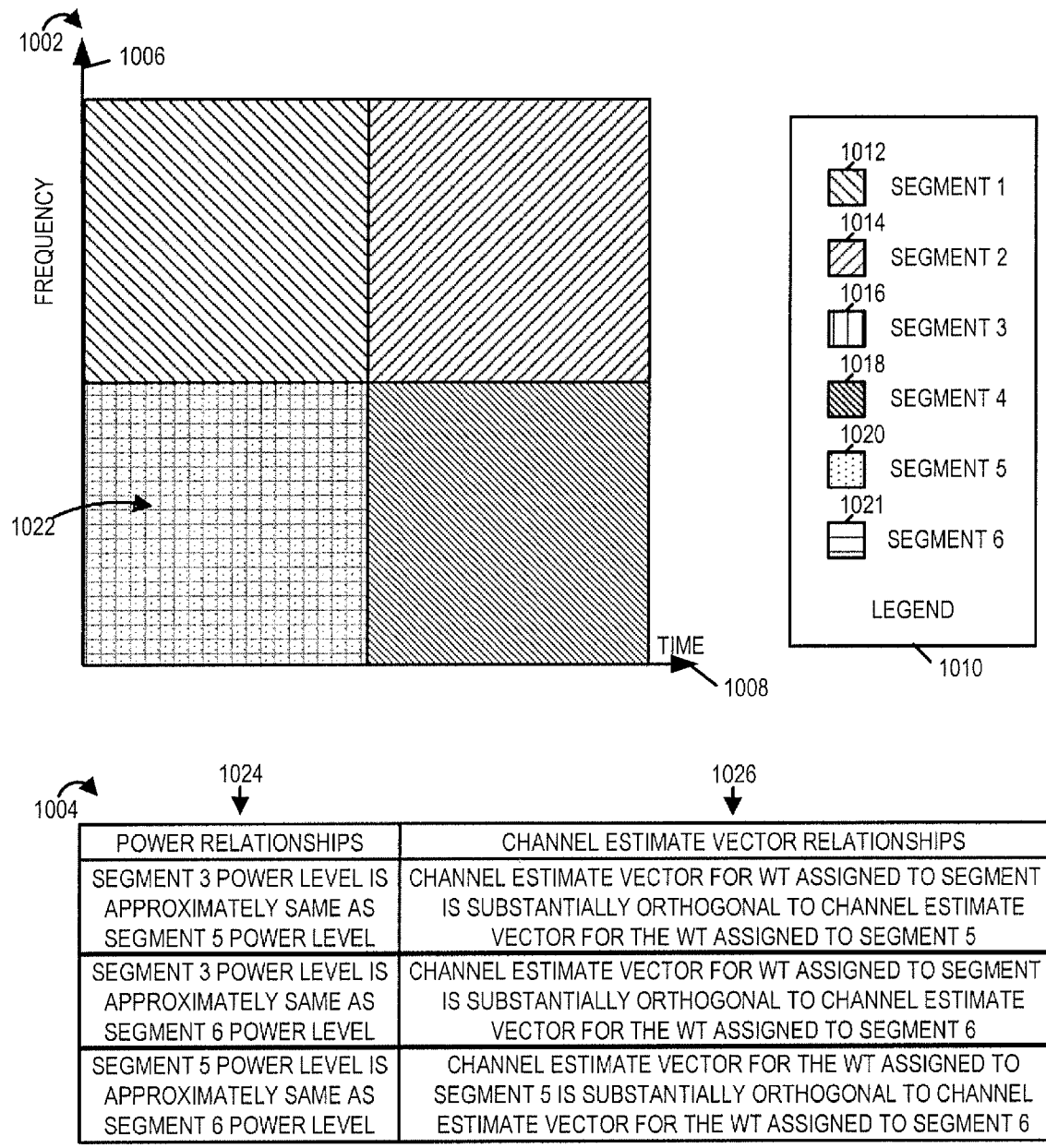
FIG. 10 includes a drawing of exemplary air link resources including exemplary overlapping segments in which three segments fully overlap each other and a table of corresponding constraint information, in accordance with various embodiments.

FIG. 10 includes a drawing 1002 of exemplary air link resources including exemplary overlapping segments in which three segments fully overlap each other and a table 1004 of corresponding constraint information, in accordance with various embodiments. Drawing 1002 plots frequency on the vertical axis 1006 vs time on the horizontal axis 1008. Legend 1010, also included in FIG. 10, includes: (i) sample pattern identification block 1012 which identifies that segment 1 is represented by descending diagonal line shading from left to right; (ii) sample pattern identification block 1014 which identifies that segment 2 is represented by ascending diagonal line shading from left to right; (iii) sample pattern identification block 1016 which identifies that segment 3 is represented by vertical line shading; (iv) sample pattern identification block 1018 which identifies that segment 4 is represented by descending fine diagonal line shading from left to right; (v) sample pattern identification block 1020 which identifies that segment 5 is represented by dotted shading, and (vi) sample pattern identification block 1021 which identifies that segment 6 is represented by horizontal line shading.

In drawing 1002 it may be observed that segments 3 and 5 and 6 fully overlap in the time frequency region 1022, e.g., segments 3 and 5 and 6 each include the same OFDM tone-symbols. Table 1004 identifies exemplary power and channel estimate vector relationships corresponding to the example of drawing 1002. First column 1024 indicates that the segment 3 power level is controlled to be approximately the same as the segment 5 power level, e.g., within 3 dBs. First column 1024 also indicates that the segment 3 power level is controlled to be approximately the same as the segment 6 power level, e.g., within 3 dBs, and that the segment 5 power level is controlled to be approximately the same as the segment 6 power level, e.g., within 3 dBs. If the segments are uplink segments, then the power level is the received power level at the base station. If the segments are downlink segments, then the power level is the transmit power level at the base station. Second column 1026 indicates that the channel estimate vector for the wireless terminal assigned to segment 3 is substantially orthogonal to the channel estimate vector for the wireless terminal assigned to segment 5, e.g., cross correlation coefficient magnitude less than 0.2. Second column 1026 also indicates that the channel estimate vector for the wireless terminal assigned to segment 3 is substantially orthogonal to the channel estimate vector for the wireless terminal assigned to segment 6, e.g., cross correlation coefficient magnitude less than 0.2. In addition, second column 1026 indicates that the channel estimate vector for the wireless terminal assigned to segment 5 is substantially orthogonal to the channel estimate vector for the wireless terminal assigned to segment 6, e.g., cross correlation coefficient magnitude less than 0.2.

Figure 11:
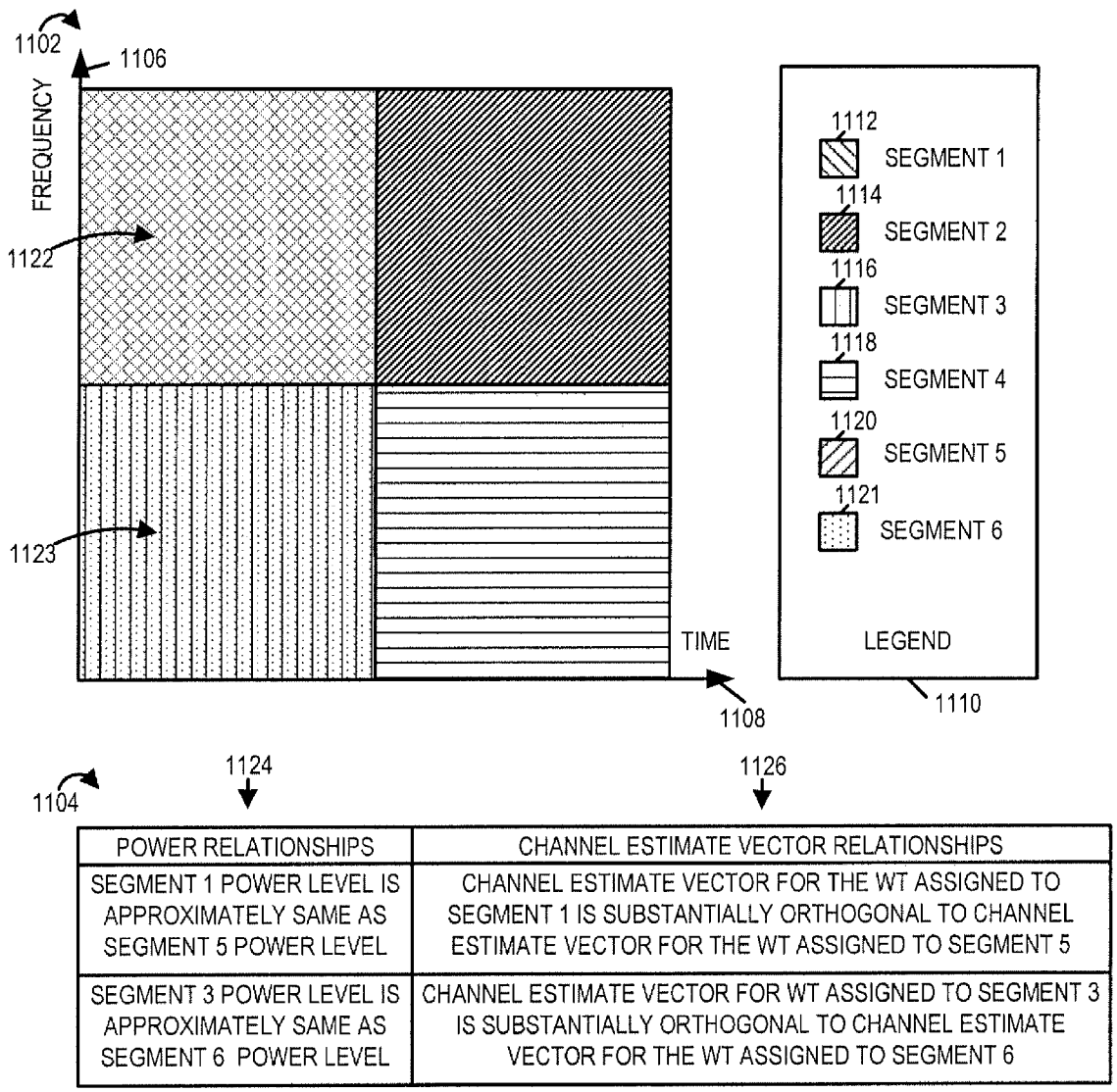
FIG. 11 includes a drawing of exemplary air link resources including exemplary overlapping segments in which a first set of two segments which fully overlap with each other and a second set of two segments which fully overlap with each other and a table of corresponding constraint information, in accordance with various embodiments.

FIG. 11 includes a drawing 1102 of exemplary air link resources including exemplary overlapping segments in which a first set of two segments fully overlap with each other and a second set of two segments fully overlap with each other and a table 1104 of corresponding constraint information, in accordance with various embodiments. Drawing 1102 plots frequency on the vertical axis 1106 vs time on the horizontal axis 1108. Legend 1110, also included in FIG. 11, includes: (i) sample pattern identification block 1112 which identifies that segment 1 is represented by descending diagonal line shading from left to right; (ii) sample pattern identification block 1114 which identifies that segment 2 is represented by fine ascending diagonal line shading from left to right; (iii) sample pattern identification block 1116 which identifies that segment 3 is represented by vertical line shading; (iv) sample pattern identification block 1118 which identifies that segment 4 is represented by horizontal line shading; (v) sample pattern identification block 1120 which identifies that segment 5 is represented by ascending diagonal line shading from left to right; and (vi) sample pattern identification block 1121 which identifies that segment 6 is represented by dotted shading.

In drawing 1102 it may be observed that segments 1 and 5 fully overlap in the time frequency region 1122, e.g., segments 1 and 5 each include the same OFDM tone-symbols. In addition, in drawing 1102 it may be observed that segments 3 and 6 fully overlap in the time frequency region 1123, e.g., segments 3 and 6 each include the same OFDM tone-symbols. Table 1104 identifies exemplary power and channel estimate vector relationships corresponding to the example of drawing 1 102. First column 1124 indicates that the segment 1 power level is controlled to be approximately the same as the segment 5 power level, e.g., within 3 dBs. First column 1124 also indicates that the segment 3 power level is controlled to be approximately the same as the segment 6 power level, e.g., within 3 dBs. If the segments are uplink segments, then the power level is the received power level at the base station. If the segments are downlink segments, then the power level is the transmit power level at the base station. Second column 1126 indicates that the channel estimate vector for the wireless terminal assigned to segment 1 is substantially orthogonal to the channel estimate vector for the wireless terminal assigned to segment 5, e.g., cross correlation coefficient magnitude less than 0.2. Second column 1126 also indicates that the channel estimate vector for the wireless terminal assigned to segment 3 is substantially orthogonal to the channel estimate vector for the wireless terminal assigned to segment 6, e.g., cross correlation coefficient magnitude less than 0.2.

Figure 12:
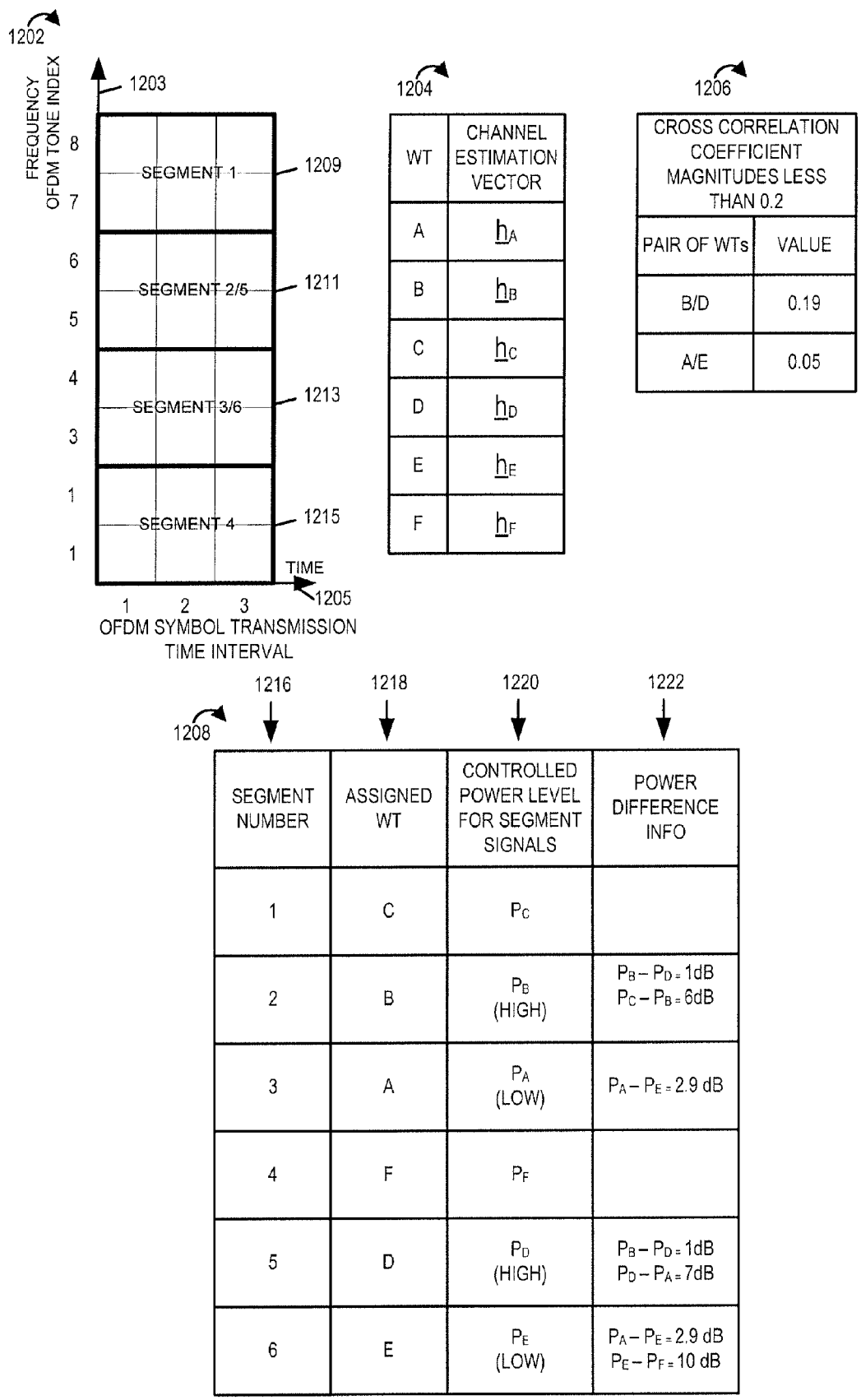
FIG. 12 illustrates exemplary air link resources, exemplary substantially overlapping segments, exemplary generated channel estimation vectors associated with wireless terminals, exemplary cross correlation information, exemplary segment assignment information, and exemplary power control information, in accordance with various embodiments.

FIG. 12 illustrates exemplary air link resources, exemplary substantially overlapping segments, exemplary generated channel estimation vectors associated with wireless terminals, exemplary cross correlation information, exemplary segment assignment information, and exemplary power control information, in accordance with various embodiments. The air link resources are illustrated by graph 1202 which plots frequency, e.g., OFDM tone index, on the vertical axis 1203 vs time, e.g., OFDM symbol transmission time interval, on the horizontal axis 1205. Graph 1202 identifies: a first set of 12 OFDM tone-symbols 1209 used for segment 1, a second set of 12 OFDM tone-symbols 1211 used for segments 2 and 5, a third set of OFDM tone-symbols 1213 used for segments 3 and 6, and a fourth set of OFDM tone-symbols 1215 used for segment 4. Table 1204 identifies that the base station generates channel estimation vectors corresponding to WTs A, B, C, D, E and F. Table 1206 indicates that the base station evaluates the cross correlation coefficients corresponding to potential pairs of wireless terminals and identifies substantially orthogonal pairs, e.g. pairs with correlation coefficient magnitudes less than 0.2. In this example, a first identified pair is the pair of WT B and WT D which has a cross correlation coefficient magnitude value of 0.19, and a second identified pair is the pair of WT A and WT E which has a cross correlation coefficient magnitude value of 0.05. The base station assigns segments and controls segment power levels as a function of the determined cross correlation coefficient information. Table 1208 identifies exemplary assignments and exemplary power information. First column 1216 of table 1208 identifies the segment; second column 1218 of table 1208 identifies the assigned wireless terminal; third column 1220 of table 1208 identifies the controlled power level for segment signals; and fourth column 1222 of table 1208 identifies power difference information.

The segments of particular interest are the segments which overlap. Segment 2 is assigned to WT B while segment 5 is assigned to WT D, and the power level for those two segments is controlled to be substantially the same, e.g., a high power level with a difference of 1 dB. Segment 3 is assigned to WT A while segment 6 is assigned to WT E, and the power level for those two segments is controlled to be substantially the same, e.g., a low power level with a difference of 2.9 dBs. In this example, the power level corresponding to WT C associated with segment 1 is 6 dBs higher than the power level associated with WT B for segment 2. In this example, the power level corresponding to WT E associated with segment 6 is 10 dBs higher than the power level associated with WT F for segment 4.

If the segments are uplink segments, e.g., uplink traffic channel segments, the power level information applies to received power at the base station. Alternatively, if the segments are downlink segments, e.g. downlink traffic channel segments, the power level information applies to transmission power at the base station. In various embodiments, the power level, e.g., $P_A, P_B, P_C, P_D, P_E, P_F$, is an average power per time frequency unit of the segment. The time frequency unit is, e.g., an OFDM tone-symbol.

Figure 13:
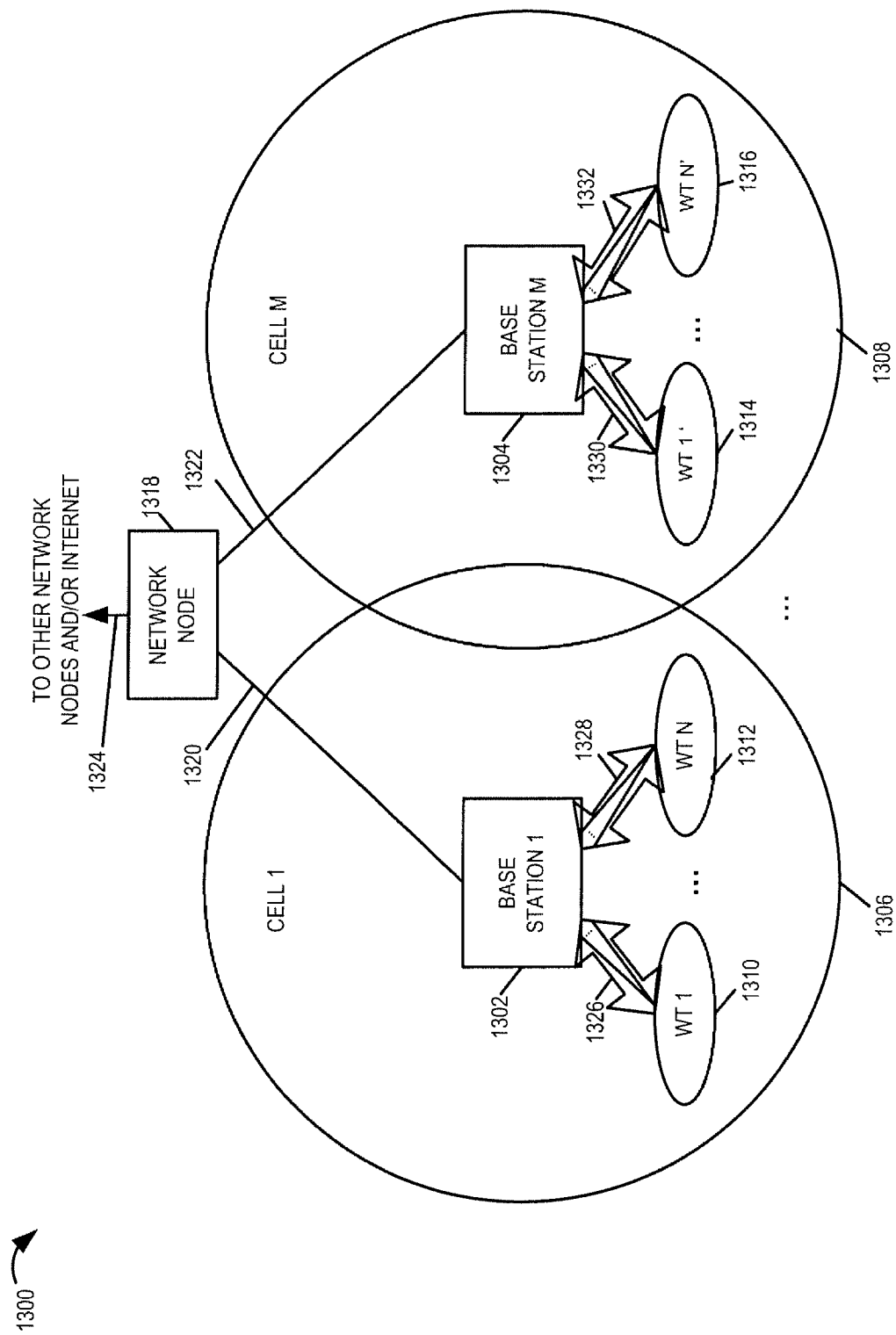
FIG. 13 is a drawing of an exemplary wireless communications system, e.g., an OFDM wireless communications system, in accordance with various embodiments.

FIG. 13 is a drawing of an exemplary wireless communications system 1300, e.g., an OFDM wireless communications system, in accordance with various embodiments. Exemplary wireless communication system 1300 includes a plurality of base stations (base station 1 1302, . . . , base station M 1304) each with a corresponding wireless coverage area (cell 1 1306, . . . , cell M 1308). At least some of the base stations include a plurality of antennas elements for communicating with a wireless terminal. System 1300 also includes network node 1318 which is coupled to base stations (1302, 1304) via network links (1320, 1322), respectively. Network node 1318 is coupled to other network nodes and/or the Internet via network link 1324. Exemplary wireless communications system 1300 also includes a plurality of wireless terminals (WT 1 1310, . . . , WT N 1312, . . . , WT 1' 1314, . . . , WT N' 1316), and at least some of the wireless terminals are mobile nodes which can move throughout the system 1300. In this example, (WT 1 1310, WT N 1312) are currently coupled to base station 1 1302 via wireless links (1326, 1328), respectively, and (WT 1' 1314, WT N' 1316) are currently coupled to base station M 1304 via wireless links (1330, 1332), respectively. For at least some of the wireless terminals for at least one of the uplink and the downlink, the at least some wireless terminals communicate with multiple base station antenna elements when signaling. At least some communications segments used by at least some base stations in communications system 1300 substantially overlap.

Figure 14:
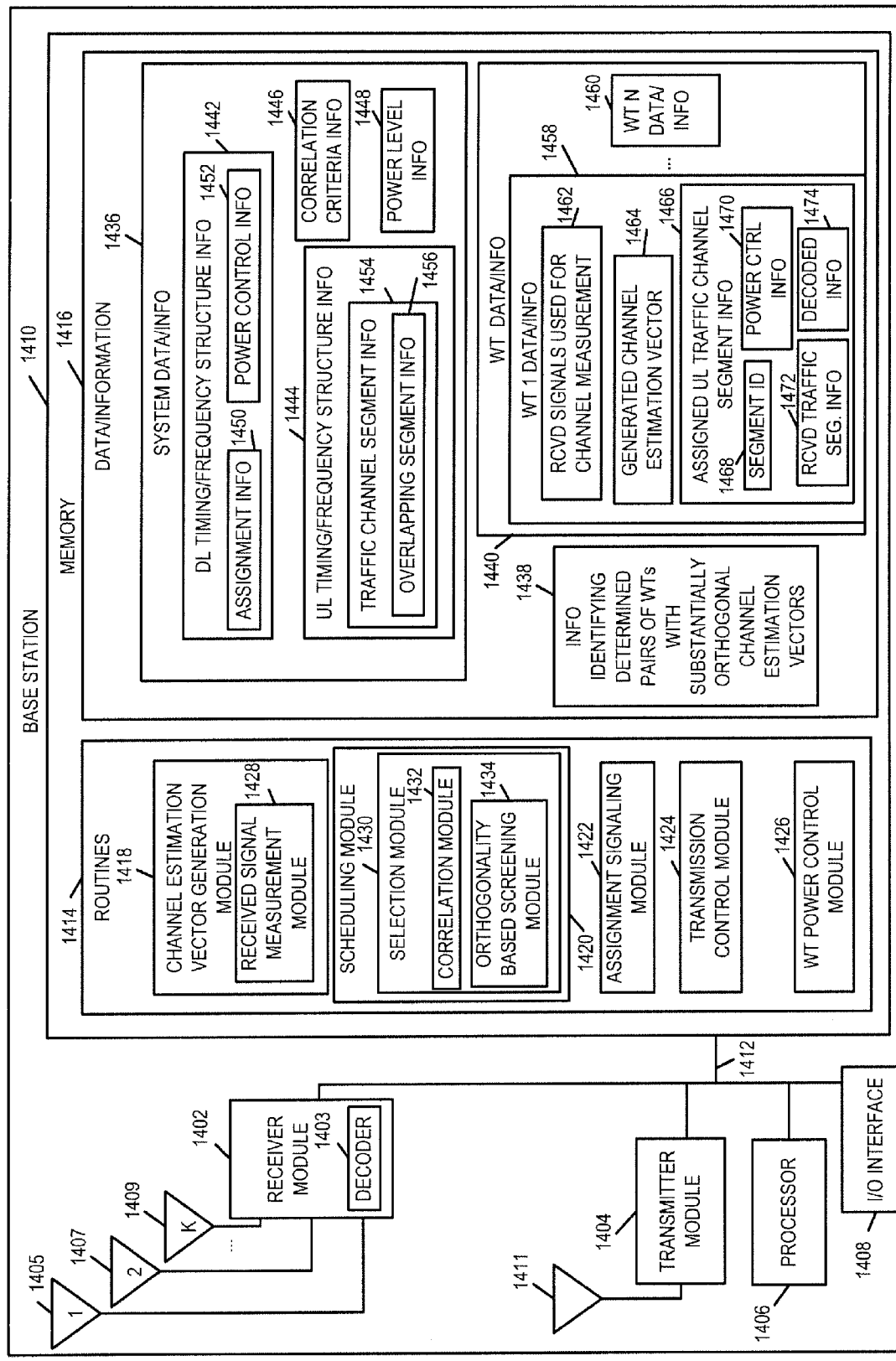
FIG. 14 is a drawing of an exemplary base station 1400 implemented in various embodiments.

FIG. 14 is a drawing of an exemplary base station 1400 implemented in accordance with various embodiments. Exemplary base station 1400 is, e.g., one of the base stations (1302, 1304) of system 1300. Exemplary base station 1400 implements, e.g., the exemplary method of flowchart 400 of FIG. 4.

Exemplary base station 1400 includes a receiver module 1402, a transmitter module 1404, a processor 1406, an I/O interface 1408, and memory 1410 coupled together via a bus 1412 over which the various elements may interchange data and information. Memory 1410 includes routines 1414 and data/information 1416. The processor 1406, e.g., a CPU, executes the routines 1414 and uses the data/information 1416 in memory 1410 to implement methods.

Receiver module 1402, e.g., an OFDM receiver, is coupled to a plurality of receive antenna elements (receive antenna element 1 1405, receive antenna element 2 1407, . . . , receive antenna element k 1409) via which the base station receives uplink signals from wireless terminals. Receiver module 1402 receives signals used for channel measurements and uplink traffic channel segment signals. Receiver module 1402 includes a decoder 1403 for decoding received signals.

Transmitter module 1404, e.g., an OFDM transmitter, is coupled to transmit antenna 1411 via which the base station transmits downlink signals to wireless terminals. Downlink signals transmitted by transmitter module 1404 include assignment signals including assignment signals for uplink traffic channel segments and wireless terminal transmission power control signals.

I/O interface 1408 couples base station 1400 to other network nodes, e.g., routers, other base stations, AAA nodes, home agent nodes, etc., and/or the Internet. I/O interface 1408, by coupling base station 1400 to a backhaul network allows a wireless terminal using a base station 1400 attachment point to communicate with another wireless terminal using an attachment point of a different base station.

Routines 1414 include a channel estimation vector generation module 1418, a scheduling module 1420, an assignment signaling module 1422, a transmission control module 1424, and a wireless terminal power control module 1426.

Channel estimation generation module 1418 generates channel estimation vectors corresponding to different wireless terminals, each channel estimation vector including channel information corresponding to different ones of the multiple receive antenna elements (1, 2, . . . K). Channel estimation vector generation module 1418 includes a received signal measurement module 1428. Received signal measurement module 1428 measures for individual wireless terminals, received signals, the measurement results to be used in determining a channel estimation vector. In some embodiments, at least some of the received signals are known signals, e.g., predetermined modulation symbols and/or intentional nulls. For example, one modulation symbol in a dwell of seven successive modulation symbols corresponding to an OFDM tone being used by a wireless terminal sometimes is a known symbol.

Scheduling module 1420, e.g., a scheduler, schedules uplink and downlink air link resources, e.g., segments, to wireless terminals using the base station as an attachment point. At least some of the uplink segments scheduled by the base station scheduling module 1420 are substantially overlapping. Scheduling module 1420 includes a selection module 1430. Selection module 1430 selects a wireless terminal to be assigned a particular segment from among a plurality of wireless terminals. Selection module 1430 performs selection of a wireless terminal for a segment based on channel estimation vectors corresponding to wireless terminals. In some embodiments, selection module 1430 selects wireless terminals for at least some overlapping segments as a function of channel estimation vector orthogonality and desired power level. In some embodiments, selection module 1403 selects wireless terminals for at least some overlapping segments as a function of channel estimation vector orthogonality and desired data rate.

Selection module 1430 includes a correlation module 1432 and an orthogonality based screening module 1434. Correlation module 1432 determines a cross correlation coefficient corresponding to a pair of channel estimation vectors corresponding to two different wireless terminals. The cross correlation coefficient is, e.g., the result of the cross product of the conjugate transform of a channel estimation vector of a first wireless terminal with the channel estimation vector of a second wireless terminal divided by the product of the magnitude of the first channel estimation vector and the magnitude of the second channel estimation vector. For example: exemplary cross correlation coefficient $\rho = (h_1 ^* x\ h_2)/(|h_1| |h_2|)$, where $h_1$ is the first wireless terminal channel estimation vector, $h_1^*$ is the conjugate transform of the first wireless terminal channel estimation vector, $h_2$ is the second wireless terminal channel estimation vector, x is a cross product operator. Orthogonality based screening module 1434 determines which sets of channel estimation vectors are substantially orthogonal to one another such that those wireless terminals are allowed to be assigned to use segments, e.g., uplink traffic channel segments, which are substantially orthogonal. Screening module 1434 uses the results of the correlation module 1432 in performing screening, e.g., pairs of wireless terminals with a correlation coefficient magnitude value less than 0.2 are allowed to be assigned to substantially overlapping segments.

Assignment signaling module 1422 generates assignment signals to convey information identifying the selected wireless terminal which has been assigned to use a particular segment, e.g., a particular uplink traffic channel segment. Some of the assigned segments substantially overlap one another. Transmission control module 1424 controls the transmitter module 1404 to transmit downlink signals including assignment signals, e.g., transmitting assignment information to selected first and second wireless terminals, the selected first and second wireless terminals being assigned first and second segments, the first and second segments including communications resources which at least substantially overlap.

Wireless terminal power control module 1426 generates signals to control the output power of wireless terminals to obtain a received signal power and/or received signal to noise ratio at the base station for a particular assigned wireless terminal corresponding to an assigned segment. Wireless terminal power control module 1426 controls, e.g., first and second wireless terminals which are assigned first and second segments which are substantially overlapping to control their output power so that signals received from those wireless terminals corresponding to the substantially overlapping segments are received at approximately equal average power per time-frequency unit at the base station, e.g., within 3 dB of each other. Continuing with the example, assume that the base station has assigned a third wireless terminal a segment which is fully or substantially non-overlapping said first and second segments in frequency and at least partially overlapping in time, the power control module 1426 can, and sometime does, control the transmission power level of the third wireless terminal so that the received power level will be substantially different from the power level of signals received from the first and second wireless terminals., e.g., at least 5 dBs different.

As an alternative, in some embodiments, wireless terminal power control module 1426 controls, e.g., first and second wireless terminals which are assigned first and second segments which are substantially overlapping to control their output power so that signals received from those wireless terminals corresponding to the substantially overlapping segments are received at approximately equal average signal to noise ratio, e.g., within 3 dB of each other. Continuing with the example, assume that the base station has assigned a third wireless terminal a segment which is fully or substantially non-overlapping said first and second segments in frequency and at least partially overlapping in time, the power control module 1426 can, and sometime does, control the transmission power level of the third wireless terminal, with regard to the third segment, so that the received SNR will be substantially different from the SNR level of signals received from the first and second wireless terminals with regard to the first and second segments, e.g., at least 5 dBs different.

In another alternative embodiment, a wireless terminal output data rate control module is included which generates signals to control the output data rate of wireless terminals to obtain a received signal to noise ratio at the base station for a particular assigned wireless terminal corresponding to an assigned segment. For example, the wireless terminal output data rate control module generates signals to the first and second wireless terminals for controlling their output data, corresponding to first and second segments, respectively, so that signals received from the first and second wireless terminals are received at the base station having approximately equal signal to noise ratio, e.g., within 3 dBs of each other. Continuing with the example, assume that the base station has assigned a third wireless terminal a segment which is fully or substantially non-overlapping said first and second segments in frequency and at least partially overlapping in time, the output data rate control module can, and sometime does, control the output data rate of the third wireless terminal, with regard to the third segment, so that the received SNR will be substantially different from the SNR level of signals received from the first and second wireless terminals with regard to the first and second segments, e.g., at least 5 dBs different.

Data/information 1416 includes system data/information 1436, information identifying determined pairs of wireless terminal with substantially orthogonal channel estimation vectors 1438 and wireless terminal data/information 1440.

System data/information 1436 includes downlink timing/frequency structure information 1442, uplink timing/frequency structure information 1444, correlation criteria information 1446, and power level information 1448. Downlink timing/frequency structure information 1442 includes downlink carrier information, downlink frequency band information, downlink tone information, downlink tone hopping information, and downlink channel structure information, e.g., in a recurring timing and frequency structure. Downlink timing/frequency structure information 1442 includes assignment information 1450 and power control information 1452. Assignment information 1450 includes assignment message format information and assignment message segment information. Power control information 1452 includes format information used to communicate wireless terminal power control information used for controlling target received power for a particular segment, e.g., an assigned uplink traffic channel segment. In some embodiments, the power information is communicated as part of an assignment message. In some embodiments, separate messages are used for the power control associated with an assigned segment. In some embodiments, the power information is indirectly communicated as data rate information associated with an assigned segment.

Uplink timing/frequency structure information 1444 includes uplink carrier information, uplink frequency band information, uplink tone information, uplink tone hopping information, and uplink channel structure information, e.g., in a recurring timing and frequency structure. Uplink timing/frequency structure information 1444 includes traffic channel segment information 1454, e.g., information identifying indexed uplink traffic channel segments in a recurring structure. A particular segment corresponds to set of time-frequency resource units, e.g., a set of OFDM tone-symbols. At least some of the uplink traffic channel segments are substantially overlapping. Traffic channel segment information 1454 includes overlapping segment information 1456. Overlapping segment information 1456 identifies segments which substantially overlap with each other. In some embodiments, some segments which substantially overlap with each other, fully overlap with each other.

Correlation criteria information 1446 includes criteria used by the screening module 1434 to identify pairs of WTs with substantially orthogonal channel estimation vectors, e.g., a cross correlation coefficient magnitude value of 0.2. Power level information 1448 includes receive power control limits used by wireless terminal power control module 1426, for substantially overlapping segments, e.g., a 3 dB limit.

Information identifying determined pairs of wireless terminals with substantially orthogonal channel estimate vectors 1438 is an output of screening module 1434. In some embodiments, the screening module 1434 identifies a set of more that two wireless terminals, e.g., three wireless terminals which are to use a set of more that two substantially overlapping segments, e.g., three segments, with the base station having more than two receive antenna elements.

WT data/information 1440 includes a plurality of sets of WT data/information (WT 1 data/information 1458, . . . , WT N data/information 1460). WT 1 data/information 1458 includes received signals used for channel measurement 1462, generated channel estimate vector 1464, and assigned uplink traffic channel segment information 1466. Received signals used for channel estimation module 1462 is an input to measurement module 1428, and generated channel estimation vector 1464 is an output from channel estimation vector generation module 1418. Assigned uplink traffic channel segment information 1466 includes segment identification information 1468, power control information 1470, received traffic segment information 1472 and decoded information 1474. Segment identification information 1468 identifies an uplink traffic channel segment scheduled by module 1420 to WT 1 with the assignment being conveyed by an assignment signal generated by assignment signaling module 1422. The assigned segment can be, and sometimes is, a segment which substantially overlaps with another assigned segment, the other assigned segment being assigned to a different selected wireless terminal having a channel estimation vector which is substantially orthogonal to WT 1's channel estimation vector. Power control information 1470 is WT power control information corresponding to the segment identified by segment ID information 1468. Received traffic segment information is received information communicated in the assigned uplink traffic channel segment identified by segment ID information which is processed by decoder 1403 to obtain decoded information 1474.

In various embodiments, segments, e.g. uplink traffic channel segments, are sets of time-frequency resources, e.g., sets of OFDM tone-symbols. In some embodiments first and second segments, e.g., first and second uplink traffic channel segments, are considered substantially overlapping if at least 50% of the time-frequency resource units included in one of the first and second segments is included in the other of the first and second segments. In some such embodiments, for at least some segments 100% of the time-frequency resource units included in one of the first and second segments is included in the other of the first and second segments. In some embodiments, the first and second segments include the same number of time-frequency resource units. In some embodiments, the first and second segments include the same number of time-frequency resource units and the same set of time-frequency resource units.

Figure 15:
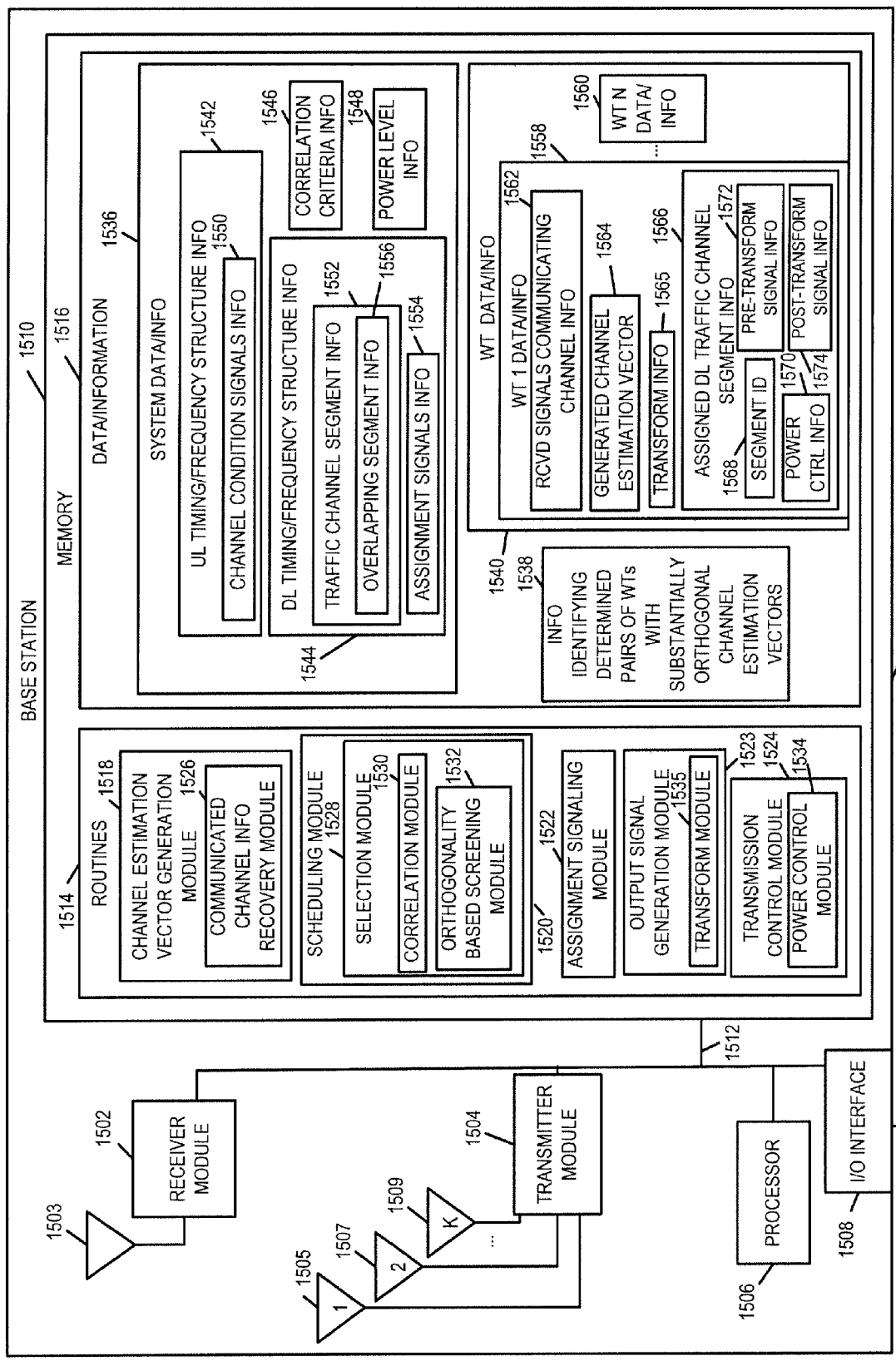
FIG. 15 is a drawing of an exemplary base station 1500 implemented in various embodiments.

FIG. 15 is a drawing of an exemplary base station 1500 implemented in accordance with various embodiments. Exemplary base station 1500 is, e.g., one of the base stations (1302, 1304) of system 1300. Exemplary base station 1500 implements, e.g., the exemplary method of flowchart 500 of FIG. 5.

Exemplary base station 1500 includes a receiver module 1502, a transmitter module 1504, a processor 1506, an I/O interface 1508, and memory 1510 coupled together via a bus 1512 over which the various elements may interchange data and information. Memory 1510 includes routines 1514 and data/information 1516. The processor 1506, e.g., a CPU, executes the routines 1514 and uses the data/information 1516 in memory 1510 to implement methods.

Receiver module 1502, e.g., an OFDM receiver, is coupled to receive antenna 1503 via which the base station receives uplink signals from wireless terminals. Receiver module 1502 receives signals communicating channel condition information, e.g., feedback reports of channels conditions and/or wireless terminal determined channel estimation vector information.

Transmitter module 1504, e.g., an OFDM transmitter, is coupled to a plurality of transmit antenna elements (transmit antenna element 1 1505, transmit antenna element 2 1507, . . . , transmit antenna element k 1509) via which the base station transmits downlink signals to wireless terminals. The base station uses multiple transmit antenna elements concurrently to transmit downlink signals to an individual wireless terminal. Downlink signals transmitted by transmitter module 1504 include known signals such as pilot signals, intentional null signals and wideband synchronization signals; assignment signals including assignment signals for downlink traffic channel segments; and downlink traffic channel segment signals. At least some of the downlink traffic channel segments substantially overlap other downlink traffic channel segments.

I/O interface 1508 couples base station 1500 to other network nodes, e.g., routers, other base stations, AAA nodes, home agent nodes, etc., and/or the Internet. I/O interface 1508, by coupling base station 1500 to a backhaul network allows a wireless terminal using a base station 1500 attachment point to communicate with another wireless terminal using an attachment point of a different base station.

Routines 1514 include a channel estimation vector generation module 1518, a scheduling module 1520, an assignment signaling module 1522, an output signal generation module 1523, and a transmission control module 1524.

Channel estimation generation module 1518 generates channel estimation vectors corresponding to different wireless terminals, each channel estimation vector including channel information corresponding to different ones of the multiple transmit antenna elements (1, 2, . . . K). Channel estimation vector generation module 1518 includes communicated channel information recovery module 1526. Communicated channel information recovery module 1526 recovers from received uplink signals, for individual wireless terminals, channel information, e.g., a wireless terminal feedback report of channel conditions based on wireless terminal measurements and/or a wireless terminal channel estimation vector based on wireless terminal measurements.

Scheduling module 1520, e.g., a scheduler, schedules uplink and downlink air link resources, e.g., segments, to wireless terminals using the base station as an attachment point. At least some of the downlink segments scheduled by the base station scheduling module 1520 are substantially overlapping. Scheduling module 1520 includes a selection module 1528. Selection module 1528 selects a wireless terminal to be assigned a particular segment from among a plurality of wireless terminals. Selection module 1528 performs selection of a wireless terminal for a segment based on channel estimation vectors corresponding to wireless terminals. In some embodiments, selection module 1528 selects wireless terminals for at least some overlapping segments as a function of channel estimation vector orthogonality and desired transmit power level. In some embodiments, selection module 1530 selects wireless terminals for at least some overlapping segments as a function of channel estimation vector orthogonality and desired data rate.

Selection module 1528 includes a correlation module 1530 and an orthogonality based screening module 1532. Correlation module 1530 determines a cross correlation coefficient corresponding to a pair of channel estimation vectors corresponding to two different wireless terminals. The cross correlation coefficient is, e.g., the result of the cross product of the conjugate transform of a channel estimation vector of a first wireless terminal with the channel estimation vector of a second wireless terminal divided by the product of the magnitude of the first channel estimation vector and the magnitude of the second channel estimation vector. For example: exemplary cross correlation coefficient $\rho=(h_1{}^*x\ h_2)/(|h_1|\ |h_2|)$, where $h_1$ is the first wireless terminal channel estimation vector, $h_1{}^*$ is the conjugate transform of the first wireless terminal channel estimation vector, $h_2$ is the second wireless terminal channel estimation vector, and x is a cross product operator. Orthogonality based screening module 1532 determines which sets of channel estimation vectors are substantially orthogonal to one another such that those wireless terminals are allowed to be assigned to use segments, e.g., uplink traffic channel segments, which are substantially orthogonal. Screening module 1532 uses the results of the correlation module 1530 in performing screening, e.g., pairs of wireless terminals with a correlation coefficient magnitude value less than 0.2 are allowed to be assigned to substantially overlapping segments.

Assignment signaling module 1522 generates assignment signals to convey information identifying the selected wireless terminal which has been assigned to use a particular segment, e.g., a particular downlink traffic channel segment. Some of the assigned segments substantially overlap one another. Output signal generation module 1523 generates outputs signals to be transmitted by transmitter module 1504 using a plurality of transmit antenna elements. Output signal generation module 1523 includes transform module 1535, which applies transform information to an input signal to generate a transformed signal. The transform used for a particular wireless terminal, is determined as a function of the generated channel estimate vector corresponding to that wireless terminal, such as to allow separation at a wireless terminal receiver between signals intended for different wireless terminals using the same air link resources. For example, first and second wireless terminals may be assigned first and second downlink traffic channel segments which substantially or fully overlap, and first transform used for the first wireless terminal signal processing for the first segment is generated from a first channel estimation vector corresponding to the first wireless terminal and the second transform used for the second wireless terminal signal processing for the second segment is generated from a second channel estimation vector corresponding to the second wireless terminal, wherein the first and second channel estimation vectors are substantially orthogonal.

Transmission control module 1524 controls the transmitter module 1504 to transmit downlink signals including assignment signals, e.g., transmitting assignment information to selected first and second wireless terminals, the selected first and second wireless terminals being assigned first and second downlink segments, the first and second segments including communications resources which at least substantially overlap. Transmission control module 1524 also controls the transmitter module 1504 to transmit downlink traffic channel segment signals, e.g., in first and second assigned downlink traffic channel segments, to the assigned first and second wireless terminals, respectively. Transmission control module 1524 includes power control module 1534. Power control module 1534 control the power level of downlink segment signals. For example, power control module 1534 controls first and second the transmission power levels of first and second segments, which are assigned to first and second wireless terminals and which are substantially overlapping to control encoded output signals corresponding to the two segments to be transmitted at approximately equal average power per time-frequency unit, e.g., within 3 dBs of each other. The first and second segments are, e.g., downlink traffic channel segments. Continuing with the example, assume that the base station has assigned a third wireless terminal a segment which is fully or substantially non-overlapping said first and second segments in frequency and at least partially overlapping in time, the power control module 1534 can, and sometime does, control the transmission power level for signals corresponding to that segment to be substantially different from the power levels of signals transmitted to the first and second wireless terminals., e.g., at least 5 dBs different.

Data/information 1516 includes system data/information 1536, information identifying determined pairs of wireless terminal with substantially orthogonal channel estimation vectors 1538 and wireless terminal data/information 1540.

System data/information 1536 includes uplink timing/frequency structure information 1542, downlink timing/frequency structure information 1544, correlation criteria information 1546, and power level information 1548. Uplink timing/frequency structure information 1542 includes uplink carrier information, uplink frequency band information, uplink tone information, uplink tone hopping information, and uplink channel structure information, e.g., in a recurring timing and frequency structure. Uplink timing/frequency structure information 1542 includes channel conditions signals information, e.g., information identifying segments in which channel condition reports and/or channel condition estimation vector information is to be received.

Downlink timing/frequency structure information 1544 includes downlink carrier information, downlink frequency band information, downlink tone information, downlink tone hopping information, and downlink channel structure information, e.g., in a recurring timing and frequency structure. Downlink timing/frequency structure information 1544 includes traffic channel segment information 1552, e.g., information identifying indexed downlink traffic channel segments in a recurring structure. A particular segment corresponds to set of time-frequency resource units, e.g., a set of OFDM tone-symbols. At least some of the downlink traffic channel segments are substantially overlapping. Traffic channel segment information 1552 includes overlapping segment information 1556. Overlapping segment information 1556 identifies segments which fully which substantially or fully overlap with each other. DL timing and frequency structure information 1544 also includes assignment signals information, e.g., information identifying segments used for carrying traffic channel assignments and/or format used in the assignment signals.

Correlation criteria information 1546 includes criteria used by the screening module 1532 to identify pairs of WTs with substantially orthogonal channel estimation vectors, e.g., a cross correlation coefficient magnitude value of 0.2. Power level information 1548 includes transmit power control limits used by power control module 1534, for substantially overlapping segments, e.g., a 3 dB limit.

Information identifying determined pairs of wireless terminals with substantially orthogonal channel estimate vectors 1538 is an output of screening module 1532. In some embodiments, the screening module 1532 identifies a set of more that two wireless terminals, e.g., three wireless terminals, which are to use a set of more that two substantially overlapping segments, e.g., three segments, with the base station having more than two transmit antenna elements.

WT data/information 1540 includes a plurality of sets of WT data/information (WT 1 data/information 1558, . . . , WT N data/information 1560). WT 1 data/information 1558 includes received signals communicating channel information 1562, generated channel estimate vector 1564, transform information 1564, and assigned downlink traffic channel segment information 1566. Received signals communicating channel information 1562 is an output of recovery module 1526, and generated channel estimation vector 1564 is an output from channel estimation vector generation module 1518. Transform information 1565 is a transform corresponding to generated channel estimation vector 1564. Assigned downlink traffic channel segment information 1566 includes segment identification information 1568, power control information 1570, pre-transform signal information 1572 and post transform signal information 1574. Segment identification information 1568 identifies a downlink traffic channel segment scheduled by module 1520 to WT 1 with the assignment being conveyed by an assignment signal generated by assignment signaling module 1522. The assigned segment can be, and sometimes is, a segment which substantially overlaps with another assigned segment, the other assigned segment being assigned to a different selected wireless terminal having a channel estimation vector which is substantially orthogonal to WT 1's channel estimation vector. Power control information 1570 is power control information corresponding to the segment identified by segment ID information 1568. Pre-transform signal information 1572 is an input to transform module 1535 while post-transform signal information 1574 is an output from transform module 1535.

In various embodiments segments, e.g., downlink traffic channel segments, are sets of time-frequency resources, e.g., sets of OFDM tone-symbols. In some embodiments first and second segments, e.g., first and second downlink traffic channel segments, are considered substantially overlapping if at least 50% of the time-frequency resource units included in one of the first and second segments is included in the other of the first and second segments. In some such embodiments, for at least some segments 100% of the time-frequency resource units included in one of the first and second segments is included in the other of the first and second segments. In some embodiments, the first and second segments include the same number of time-frequency resource units. In some embodiments, the first and second segments include the same number of time-frequency resource units and the same set of time-frequency resource units.

FIG. 16 comprising the combination of FIG. 16A, FIG. 16B, FIG. 16C and FIG. 16D is a flowchart 1600 of an exemplary method of operating a base station including multiple antenna elements in accordance with various embodiments. The exemplary base station is, e.g., a base station including features of base station 1400 of FIG. 14 and features of base station 1500 of FIG. 15. Operation starts in step 1602, where the base station is powered on and initialized. Operation proceeds from start step 1602 to steps 1604, 1606 and 1608.

Figure 16A:
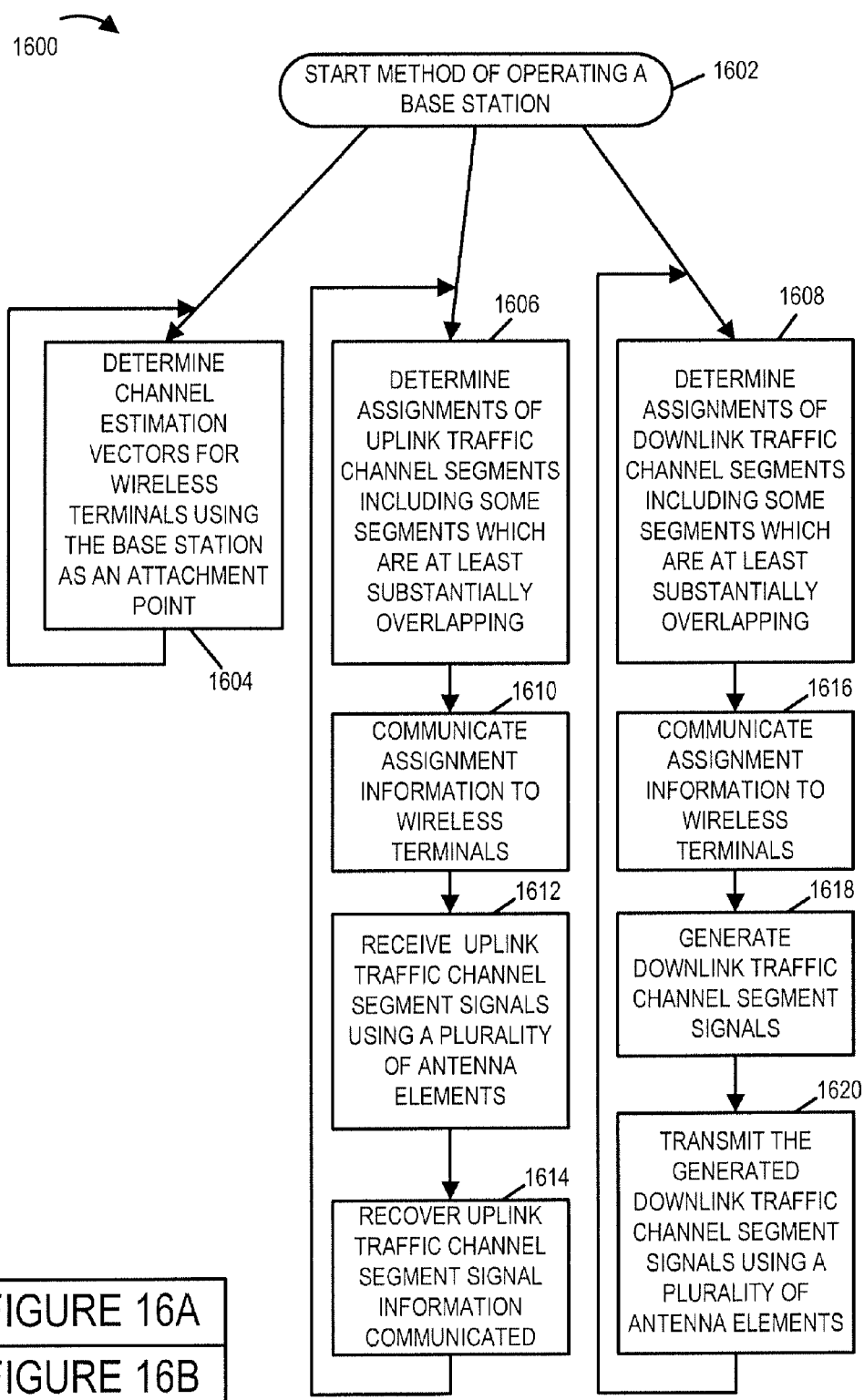
FIG. 16 comprising the combination of FIG. 16A, FIG. 16B, FIG. 16C
FIG. 16D is a flowchart of an exemplary method of operating a base station including multiple antenna elements in accordance with various embodiments.
Figure 16B:
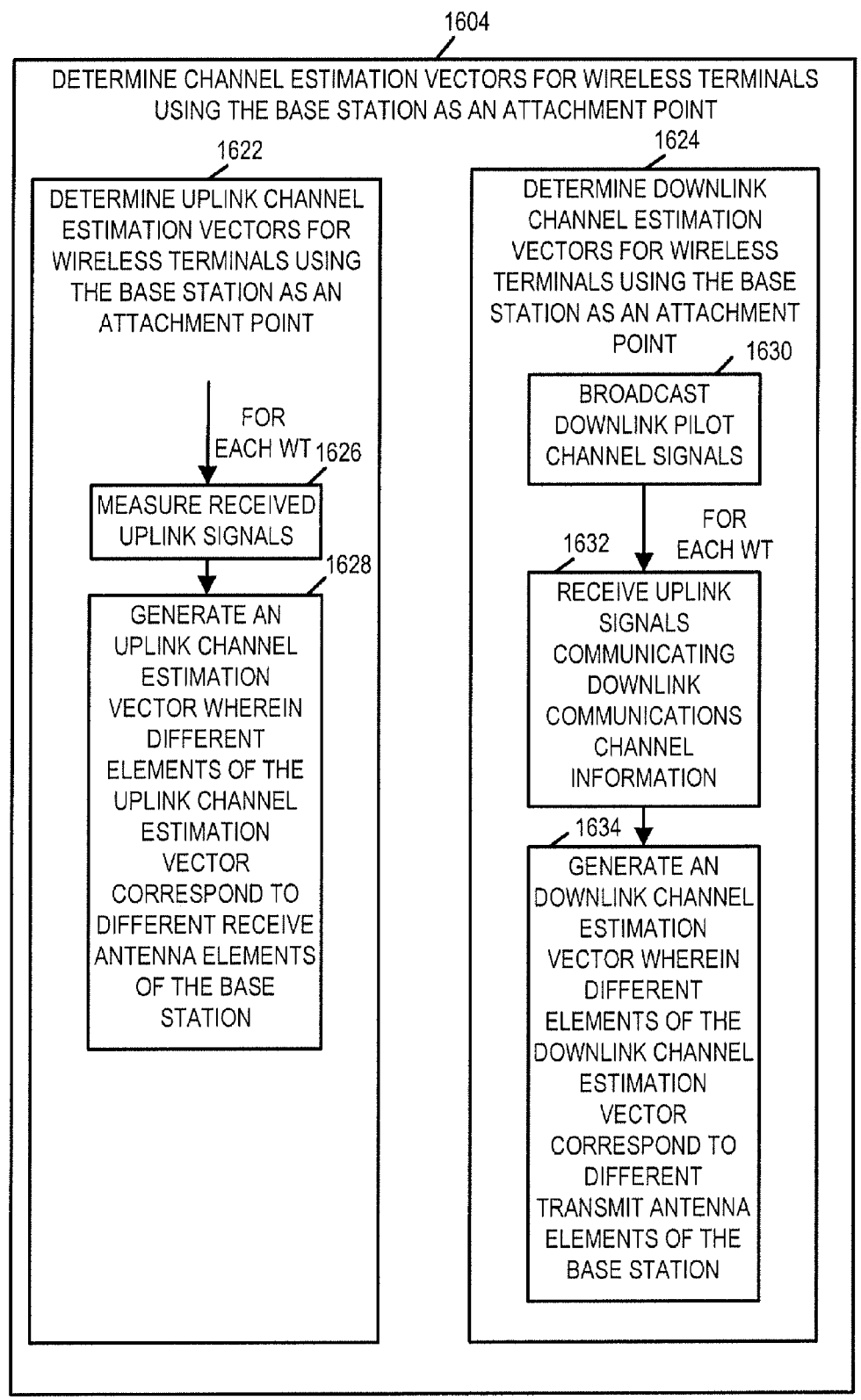

In step 1604, which is performed on an ongoing basis, the base station determines channel estimation vectors for wireless terminals using the base station as an attachment point. FIG. 16B illustrates exemplary sub-steps performed in step 1604.

Step 1604 includes sub-steps 1622 and 1624.

In sub-step 1622, the base station determines uplink channel estimation vectors for wireless terminals using the base station as an attachment point. Sub-step 1622 includes sub-steps 1626 and 1628, which are performed for each of wireless terminal currently using the base station as a point of attachment. In sub-step 1626, the base station measures received uplink signals using receive antenna elements. In some embodiments, at least some of the received uplink signals convey known modulation symbols and or intentional nulls. In some embodiments, one modulation symbol in a set of modulation symbols is a known symbol, e.g., one symbol in a dwell of a fixed number, e.g., seven, of basic transmission units using the same tone is a known modulation symbol. Operation proceeds from sub-step 1626 to sub-step 1628. In sub-step 1628, the base station generates an uplink channel estimation vector wherein different elements of the uplink channel estimation vector correspond to different receive antenna elements of the base station.

In sub-step 1624, the base station determines downlink channel estimation vectors for wireless terminals using the base station as an attachment point. Sub-step 1624 includes sub-steps 1630, 1632 and 1634. In sub-step 1630 the base station broadcasts downlink pilot channel signals intended to be received and utilized by wireless terminals in measuring channel conditions and/or determining a downlink channel estimation vector. In some embodiments, the base station transmits wideband synchronization signals in place of or in addition to the pilot channel signals to be used by wireless terminals in measuring channel conditions and/or determining a downlink channel estimation vector. Operation proceeds from sub-step 1630 to sub-step 1632. Sub-steps 1632 and 1634 are performed for each wireless terminal using the base station as a current point of network attachment. In sub-step 1632, the base station receives uplink signals communicating downlink communications channel information, e.g., a channel condition feedback report and/or a wireless terminal determined downlink channel estimation vector. Operation proceeds from sub-step 1632 to sub-step 1634, in which the base station generates a downlink channel estimation vector wherein different elements of the downlink channel estimation vector correspond to different transmit antenna elements of the base station.

Figure 16C:
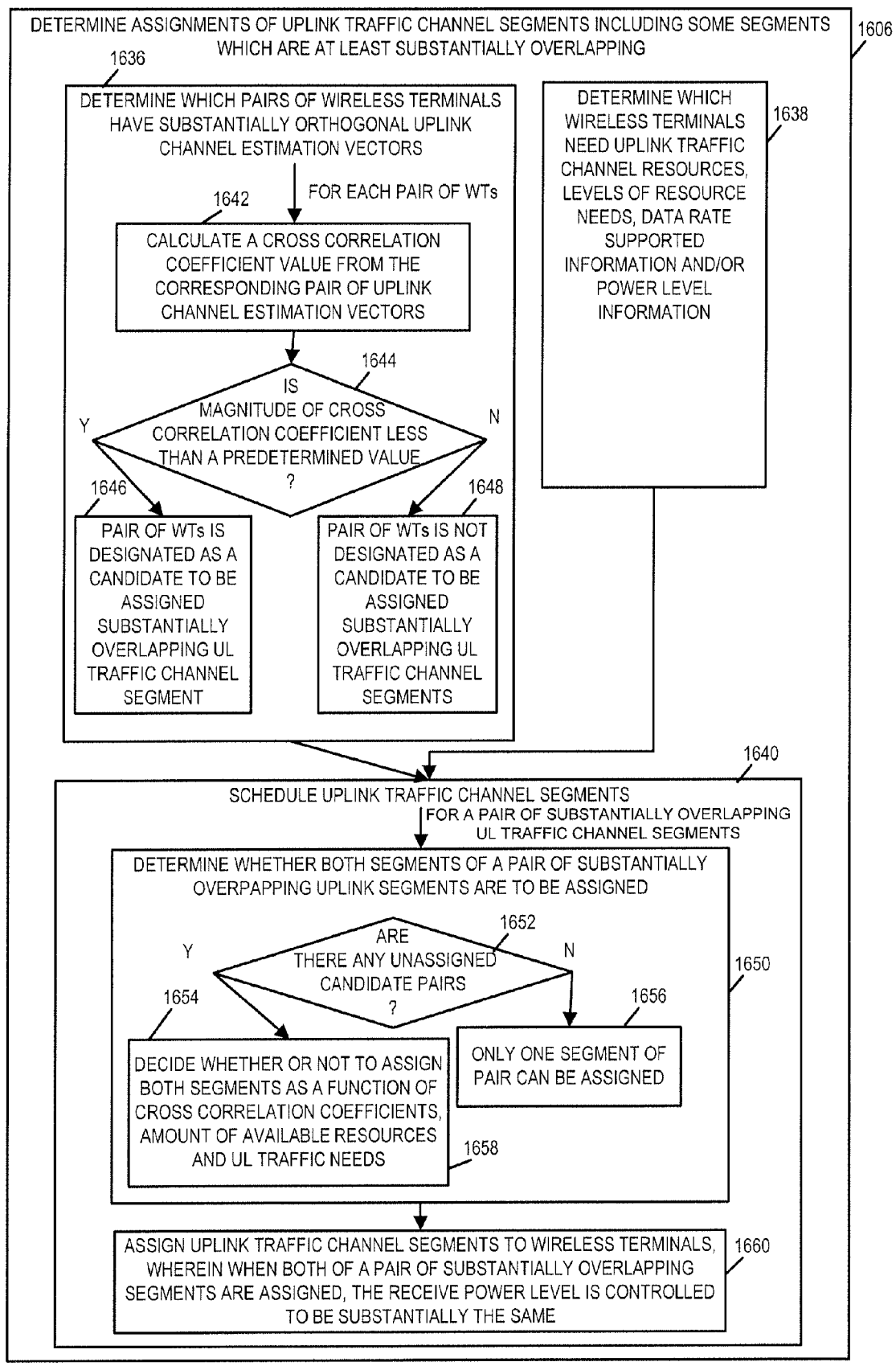

Returning to step 1606, in step 1606, the base station determines assignments of uplink traffic channel segment including some segments which are at least substantially overlapping. FIG. 16C illustrates exemplary sub-steps performed in step 1606. Step 1606 includes sub-steps 1636, 1638 and 1640. In sub-step 1636, the base station determines which pairs of wireless terminals have substantially orthogonal uplink channel estimation vectors. Sub-step 1636 includes sub-steps 1642, 1644, 1646 and 1648, which are performed for each pair of wireless terminals. In sub-step 1642, the base station calculates a cross correlation coefficient value from the corresponding pair of uplink channel estimation vectors associated with the pair of wireless terminals. For example, the value for the cross correlation coefficient can be in the range of −1 to +1 wherein a value of 0 represents complete orthogonality. Operation proceeds from step 1642 to step 1644. In step 1644, the base station checks if the magnitude of the cross correlation coefficient value obtained in step 1642 is less than a predetermined value, e.g., 0.2. If it is less than the predetermined value, then operation proceeds to step 1646, where the base station designates the pair of WTs as a candidate to be assigned substantially overlapping uplink traffic channel segments. If it is greater than or equal to the predetermined value, then operation proceeds to step 1648, where the base station designates the pair of WTs as not being a candidate to be assigned substantially overlapping uplink traffic channel segments.

Returning to sub-step 1638, in sub-step 1638, the base station determines which wireless terminals currently need uplink traffic channel resources, the levels of resource needs, data rates supported and/or power level information. Operation proceeds from sub-steps 1636 and 1638 to sub-step 1640.

In sub-step 1640, the base station schedules uplink traffic channel segments using the information from sub-steps 1636 and 1638. Sub-step 1640 includes sub-steps 1650 and 1660. Operation proceeds to sub-step 1650 for each of pairs of substanatially overlapping uplink traffic channel segments to be assigned. In sub-step 1650, the base station determined whether both segments of a pair of substantially overlapping uplink segments are to be assigned. Sub-step 1650 includes sub-steps 1652, 1654 and 1656. In sub-step 1652, the base station determines if there are any unassigned candidate pairs. If there are any unassigned designated candidate pairs, then operation proceeds to step 1654, otherwise operation proceeds to step 1656, where the base station determines that only one segment of the pair can be assigned. In step 1654, the base station decides whether or not to assign both segments as a function of cross correlation coefficients, amounts of available resources and uplink traffic channel needs. For example, if uplink channel resource utilization is very low and there are excess segments available, in some embodiments, one segment of a pair is left unassigned. If resource utilization is very high, in some embodiments, both segments of a pair may be assigned. In some embodiments, where there are multiple candidate pairs that may be allocated to the same segment pair, the pair of wireless terminals with the lower cross correlation magnitude is selected. In some embodiments power considerations are used to select a pair from alternative pairs, e.g., selecting a pair which will have the lowest receive power difference for the pair of substantially overlapping segments.

Operation proceeds from sub-step 1650 to sub-step 1660. In sub-step 1660, the base station assigns uplink traffic channel segments to wireless terminals, wherein when both of a pair of substantially overlapping uplink traffic channel segments are assigned, the base controls the receive power level to be substantially the same.

Operation proceeds from step 1606 to step 1610. In step 1610, the base station communicates assignment information to the wireless terminals conveying the determined assignments of step 1606. In step 1610 assignment messages are generated and transmitted. In various embodiments, the power control decision of step 1606 corresponding to the assigned segments are also conveyed to the wireless terminals. In some embodiments, the power control information is communicated as part of the segment assignment signals. In some embodiments power control information is indirectly communicated as part of data rate information associated with the segment which is communicated. Operation proceeds from step 1610 to step 1612.

In step 1612, the base station receives uplink traffic channel segment signals using a plurality of antenna elements. For example, step 1612 includes receiving signals from a first wireless terminal and a second wireless terminal in first and second assigned uplink traffic channel segments which are substantially overlapping at substantially the same receive power level, e.g., within 3 dBs. Continuing with the example, consider that the base station also receives during at least part of the same time interval signals from a third wireless terminal in a third assigned uplink traffic channel segment, which is non-substantially overlapping or non-overlapping with the first and second uplink traffic channel segments, the received power level of the third wireless terminal signals being substantially different from that of the first and second wireless terminals, e.g., a difference of at least 5 dBs. Operation proceeds from step 1612 to step 1614, in which the base station recovers uplink traffic channel segment signal information being communicated. The recovery operation of step 1614 include signal processing including combining operations using signals received from the multiple base station receive antenna elements and decoding operations. Operation proceeds from step 1614 to step 1606.

Figure 16D:
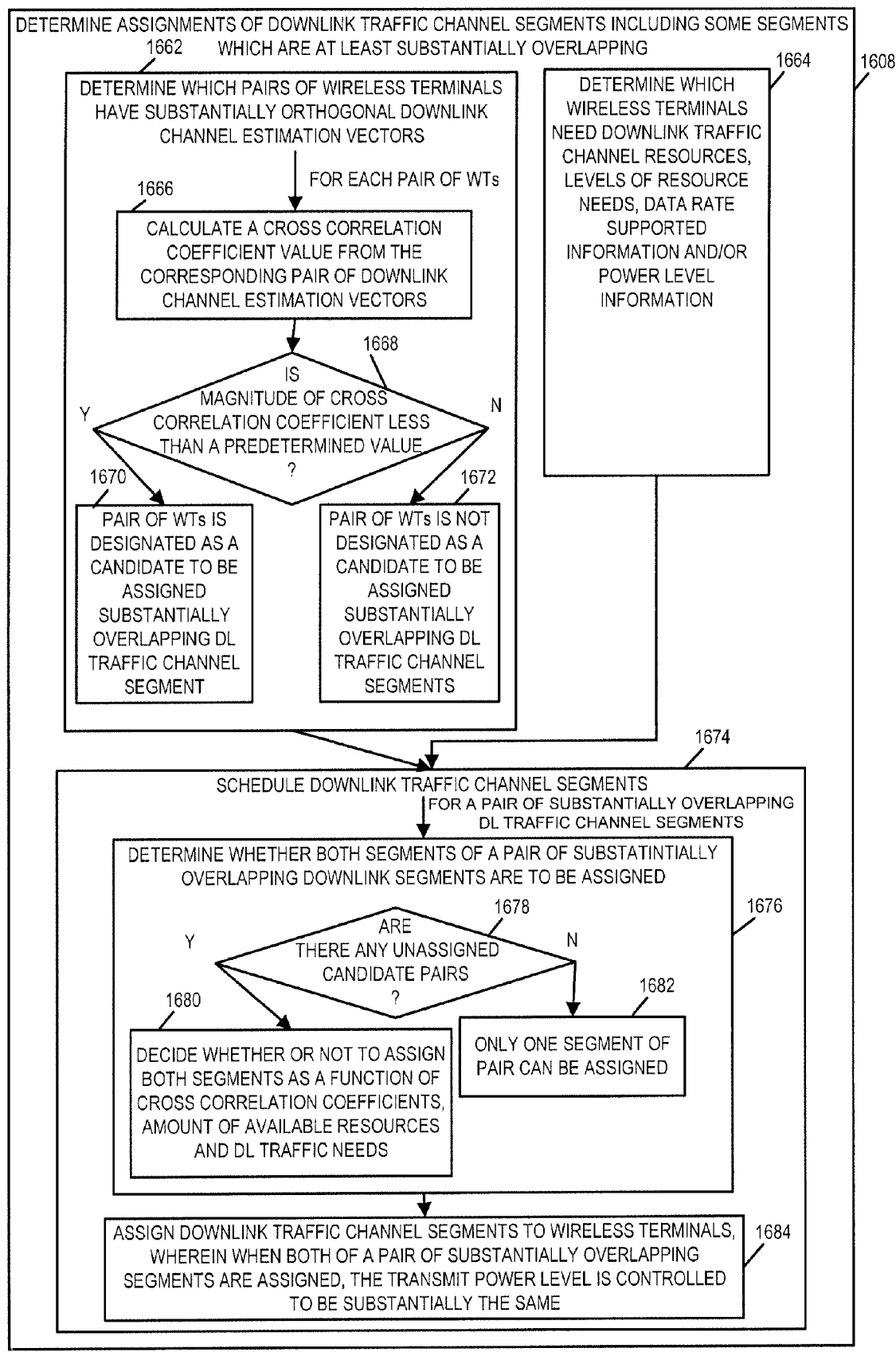

Returning to step 1608, in step 1608, the base station determines assignments of downlink traffic channel segment including some segments which are at least substantially overlapping. FIG. 16D illustrates exemplary sub-steps performed in step 1608. Step 1608 includes sub-steps 1662, 1664 and 1674. In sub-step 1662, the base station determines which pairs of wireless terminals have substantially orthogonal downlink channel estimation vectors. Sub-step 1662 includes sub-steps 1666, 1668, 1670 and 1672, which are performed for each pair of wireless terminals. In sub-step 1666, the base station calculates a cross correlation coefficient value from the corresponding pair of downlink channel estimation vectors associated for the pair of wireless terminals. For example, the value for the cross correlation coefficient can be in the range of −1 to +1 wherein a value of 0 represents complete orthogonality. Operation proceeds from step 1666 to step 1668. In step 1668, the base station checks if the magnitude of the cross correlation coefficient value obtained in step 1666 is less than a predetermined value, e.g., 0.2. If it is less than the predetermined value, then operation proceeds to step 1670, where the base station designates the pair of WTs as a candidate to be assigned substantially overlapping downlink traffic channel segments. If it is greater than or equal to the predetermined value, then operation proceeds to step 1672, where the base station designates the pair of WTs as not being a candidate to be assigned substantially overlapping downlink traffic channel segments.

Returning to sub-step 1664, in sub-step 1664, the base station determines which wireless terminals currently need downlink traffic channel resources, the levels of resource needs, data rates supported and/or power level information. Operation proceeds from sub-steps 1662 and 1664 to sub-step 1674.

In sub-step 1674, the base station schedules downlink traffic channel segments using the information from sub-steps 1662 and 1664. Sub-step 1674 includes sub-steps 1676 and 1684. Operation proceeds to sub-step 1676 for each of pairs of substantially overlapping downlink traffic channel segments to be assigned. In sub-step 1676, the base station determines whether both segments of a pair of substantially overlapping downlink segments are to be assigned. Sub-step 1676 includes sub-steps 1678, 1680 and 1682. In sub-step 1678, the base station determines if there are any unassigned candidate pairs. If there are any unassigned designated candidate pairs, then operation proceeds to step 1680, otherwise operation proceeds to step 1682, where the base station determines that only one segment of the pair can be assigned. In step 1680, the base station decides whether or not to assign both segments as a function of cross correlation coefficients, amounts of available resources and downlink traffic channel needs. For example, if downlink channel resource utilization is very low and there are excess segments available, in some embodiments, one segment of a pair is left unassigned. If resource utilization is very high, in some embodiments, both segments of a pair are assigned. In some embodiments, where there are multiple candidate pairs that may be allocated to the same segment pair, the pair of wireless terminals with the lower cross correlation coefficient magnitude is selected. In some embodiments power considerations are used to select a pair from alternative pairs, e.g., selecting a pair which in which it is advantageous to transmit at the same power level using the substantially overlapping segments.

Operation proceeds from sub-step 1676 to sub-step 1684. In sub-step 1684, the base station assigns downlink traffic channel segments to wireless terminals, wherein when both of a pair of substantially overlapping uplink traffic channel segments are assigned, the base controls the transmit power level to be substantially the same, e.g., within 3 dBs.

Operation proceeds from step 1608 to step 1616. In step 1616, the base station communicates assignment information to the wireless terminals conveying the determined assignments of step 1608. In step 1618 assignment messages are generated and transmitted. In some embodiments, assignments for both downlink and uplink traffic channel segments are communicated in the same messages. Operation proceeds from step 1616 to step 1618.

In step 1618, the base station generates downlink traffic channel segment signals. For example, step 1618 includes subjecting first and second signals to be transmitted corresponding to first and second wireless terminals, respectively, to first and second transforms, respectively, each of the first and second transforms being generated by the base station from downlink channel estimation vectors corresponding to the first and second wireless terminals, respectively. The first and second transformed signals are scheduled to be transmitted in first and second downlink traffic channel respectively, which are substantially overlapping segments. Continuing with the example, a third signal may be generated to be transmitted in a third downlink traffic channel segment which does not overlap or does not substantially overlap with the first and second downlink traffic channel segments. Operation proceeds from step 1618 to step 1620.

In step 1620, the base station transmits the generated downlink traffic channel segment signals using a plurality of antenna elements. For example, the first and second transformed signals corresponding to the first and second wireless terminals are transmitted into first and second downlink traffic channel segments which are substantially overlapping and the base station controls the transmit power to be substantially the same, e.g., within 3 dBs. Continuing with the example, the third signal corresponding to the third wireless terminal is transmitted in the third downlink traffic channel segment at a substantially different power level than the power level associated with the first and second segments, e.g., a difference of at least 5 dBs. Operation proceeds from step 1620 to step 1608.

In various embodiments segments are sets of time-frequency resources, e.g., sets of OFDM tone-symbols. In some embodiments first and second segments are considered substantially overlapping if at least 50% of the time-frequency resource units included in one of the first and second segments is included in the other of the first and second segments. In some such embodiments, for at least some segments 100% of the time-frequency resource units included in one of the first and second segments is included in the other of the first and second segments. In some embodiments, the first and second segments include the same number of time-frequency resource units. In some embodiments, the first and second segments include the same number of time-frequency resource units, and the same set of time-frequency resource units.

Although described in FIGS. 14, 15 and 16 in terms of substantially overlapping air link resources being using for traffic channel segments, in other embodiments the substantially overlapping segments which are assigned can be and sometimes are used for other purposes, e.g., control information signaling.

FIG. 17 is a drawing 1702 illustrating exemplary substantially overlapping segments in accordance with various embodiments. In this example, each of the available segments fully overlaps with another segment. Drawing 1700 plots frequency (OFDM tone index) on the vertical axis 1703 vs time (OFDM symbol transmission time interval) on the horizontal axis 1705. The six OFDM tone-symbols corresponding to air link resource region 1709 maps to both segment 1 and segment 5. The six OFDM tone-symbols corresponding to air link resource region 1711 maps to both segment 2 and segment 6. The six OFDM tone-symbols corresponding to air link resource region 1713 maps to both segment 3 and segment 7. The six OFDM tone-symbols corresponding to air link resource region 1717 maps to both segment 4 and segment 8. A base station tests for candidate wireless terminal pairs having substantially orthogonal channel estimation vectors, and is allowed to populate both segments in a pair of segments with assignments to a pair of wireless terminals which satisfy a cross correlation coefficient criteria. Otherwise, the base station assigns at most one wireless terminal to use one of the paired segments. In addition the base station, in some embodiments, has the flexibility to decide to assign pairs of wireless terminals which satisfy the cross correlation coefficient criteria to non-overlapping segments, e.g., in response to low overall demand on air link resources.

FIG. 18 is a drawing 1802 illustrating exemplary substantially overlapping segments in accordance with various embodiments. In this example, each of the available segments fully overlaps with another segment. Drawing 1800 plots frequency (OFDM tone index) on the vertical axis 1803 vs time (OFDM symbol transmission time interval) on the horizontal axis 1805. The six OFDM tone-symbols corresponding to air link resource region 1807 maps to both segment 1 and segment 5. It may be observed that in this exemplary embodiment tone-symbols of a segment can be and sometimes are non-continuous. Similarly, six OFDM tone-symbols map to both segment 2 and segment 6; six OFDM tone-symbols map to both segment 3 and segment 7; six OFDM tone-symbols map to both segment 4 and segment 8. This type of tone-symbol allocation in a segment is used in some embodiments for downlink channel segments, in which logical channel to physical channel tone hopping is implemented on a per OFDM symbol transmission time interval basis.

FIG. 19 is a drawing 1902 illustrating exemplary substantially overlapping segments in accordance with various embodiments. In this example, each of the available segments fully overlaps with another segment. Drawing 1900 plots frequency (OFDM tone index) on the vertical axis 1903 vs time (OFDM symbol transmission time interval) on the horizontal axis 1905. The six OFDM tone-symbols corresponding to air link resource region 1907 maps to both segment 1 and segment 5. It may be observed that in this exemplary embodiment tone-symbols of a segment can be and sometimes are non-continuous, and that within the segment a set of tones is maintained for the duration of a dwell. In this example, the duration of a dwell is the same as the duration of a segment. In some embodiments, the duration of a segment is a multiple of the duration of a dwell. Similarly, six OFDM tone-symbols map to both segment 2 and segment 6; six OFDM tone-symbols map to both segment 3 and segment 7; six OFDM tone-symbols map to both segment 4 and segment 8. This type of tone-symbol allocation in a segment is used in some embodiments for uplink channel segments, in which logical channel to physical channel tone hopping is implemented on a per dwell basis, where a dwell duration is a predetermined number of consecutive OFDM symbol transmission time intervals.

In various embodiments in which at least some uplink segments overlap, the overlapping is structured such that a user, with respect to an uplink segment, will only overlap with at most one other user, with respect to another uplink segment. In this case, the uplink scheduler will choose users and rates according to the following rules with respect to the SNR range problem besides the other scheduler user/rate selection considerations: (1) the spatial correlation between the chosen users is relatively small; and (2) the difference between the operating SNRs (in rate selection) is relatively small. In some such embodiments, users and rates are selected such that a certain utility function on rates over the system is maximized.

Please note that there is a tradeoff between these two constraints, i.e., we do not necessarily require both the spatial correlation and the SNR difference to be extremely small. In one extreme, when the spatial correlation is zero, there is no constraint on the SNR difference. For ease of implementation, a heuristic product rule can be used which takes care of both constraints, i.e., in the uplink, when we compute the potential rates of the potential candidate users, we impose the constraint on their rate difference $\delta_R$ (which is directly related to receive SNR) such that $$f(\delta_R)*g(Cs)<Tp,$$

where $\delta_R$ is the rate difference, Cs is the spatial correlate between two users and $f(\cdot)$ and $g(\cdot)$ are some generic predefined functions. Tp is a predefined system constant.

Figure 20:
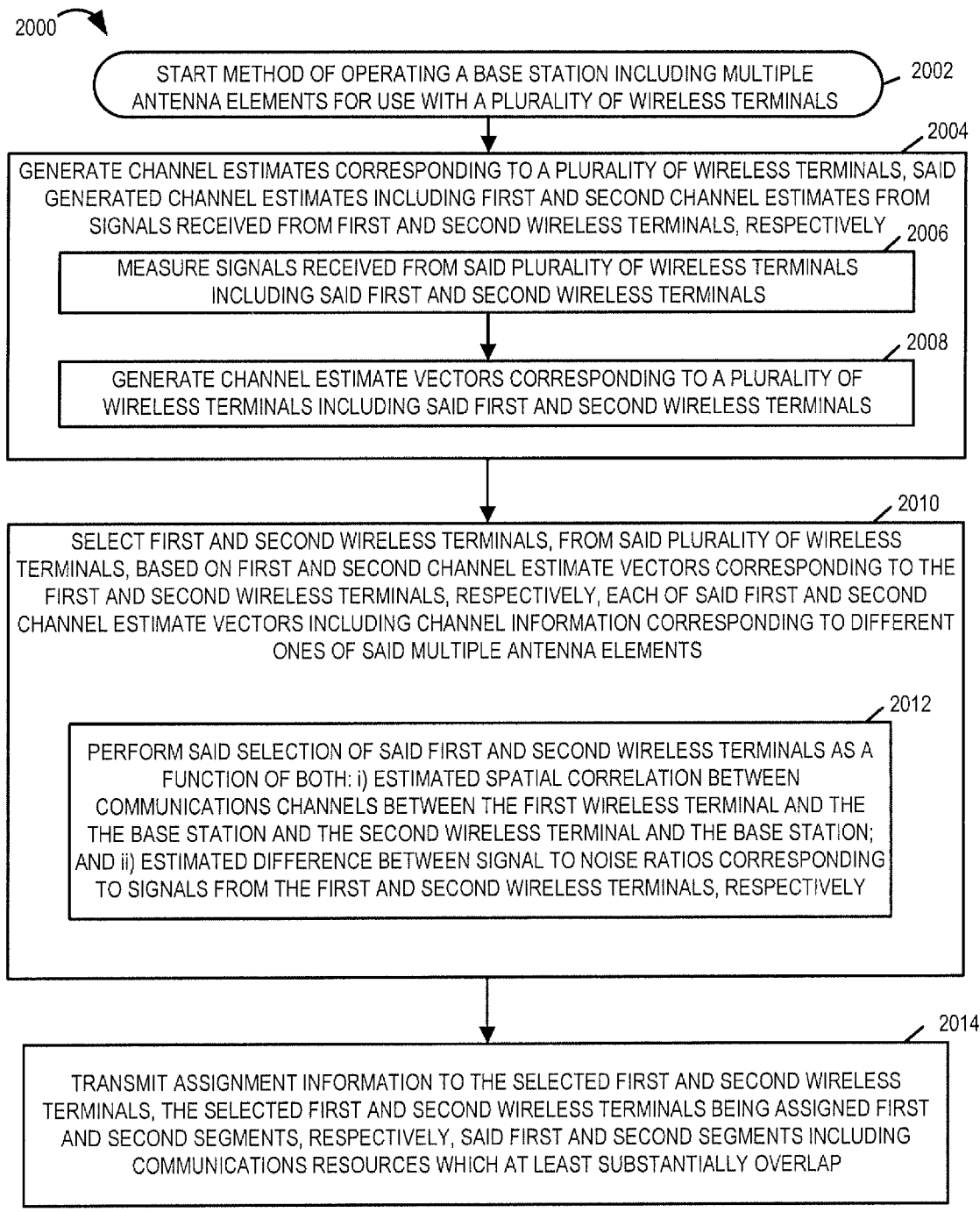
FIG. 20 is a drawing of a flowchart of an exemplary method of operating a base station including multiple antenna elements for use with a plurality of wireless terminals in accordance with various embodiments.

FIG. 20 is a drawing of a flowchart 2000 of an exemplary method of operating a base station including multiple antenna elements for use with a plurality of wireless terminals in accordance with various embodiments. Operation starts in step 2002, where the base station is powered on and initialized and proceeds to step 2004.

In step 2004, the base station generates channel estimates corresponding to a plurality of wireless terminals, said generated channel estimates including first and second channel estimates from signals received from first and second wireless terminals, respectively. Step 2004 includes sub-steps 2006 and 2008. In sub-step 2006, the base station measures signals received from said plurality of wireless terminals including said first and second wireless terminals. Then, in sub-step 2008, the base station generates channel estimate vectors corresponding to a plurality of wireless terminals including said first and second wireless terminals. Operation proceeds from step 2004 to step 2010.

In step 2010, the base station selects first and second wireless terminals, from said plurality of wireless terminals, based on first and second channel estimate vectors corresponding to the first and second wireless terminals, respectively, each of said first and second channel estimate vectors including channel information corresponding to different ones of said multiple antenna elements. Step 2010 includes sub-step 2012. In sub-step 2012, the base station performs said selection of the said first and second wireless terminals as a function of both: i) estimated spatial correlation between communications channels between the first wireless terminal and the base station and the second wireless terminal and the base station; and ii) an estimated difference between signal to noise ratios corresponding to signals from the first and second wireless terminal, respectively. In various embodiments, the selection of step 2012 selects the first and second wireless terminals from said plurality of wireless terminals to satisfy a predetermined constraint. In some such embodiments, the constraint is a function output limit which can be satisfied by different combinations of estimated spatial correlation and estimated differences between signal to noise ratios.

Operation proceeds from step 2010 to step 2104. In step 21014, the base station transmits assignment information to the selected first and second wireless terminals, the selected first and second wireless terminals being assigned first and second segments, respectively, said first and second segments including communications resources which at least substantially overlap.

Figure 21:
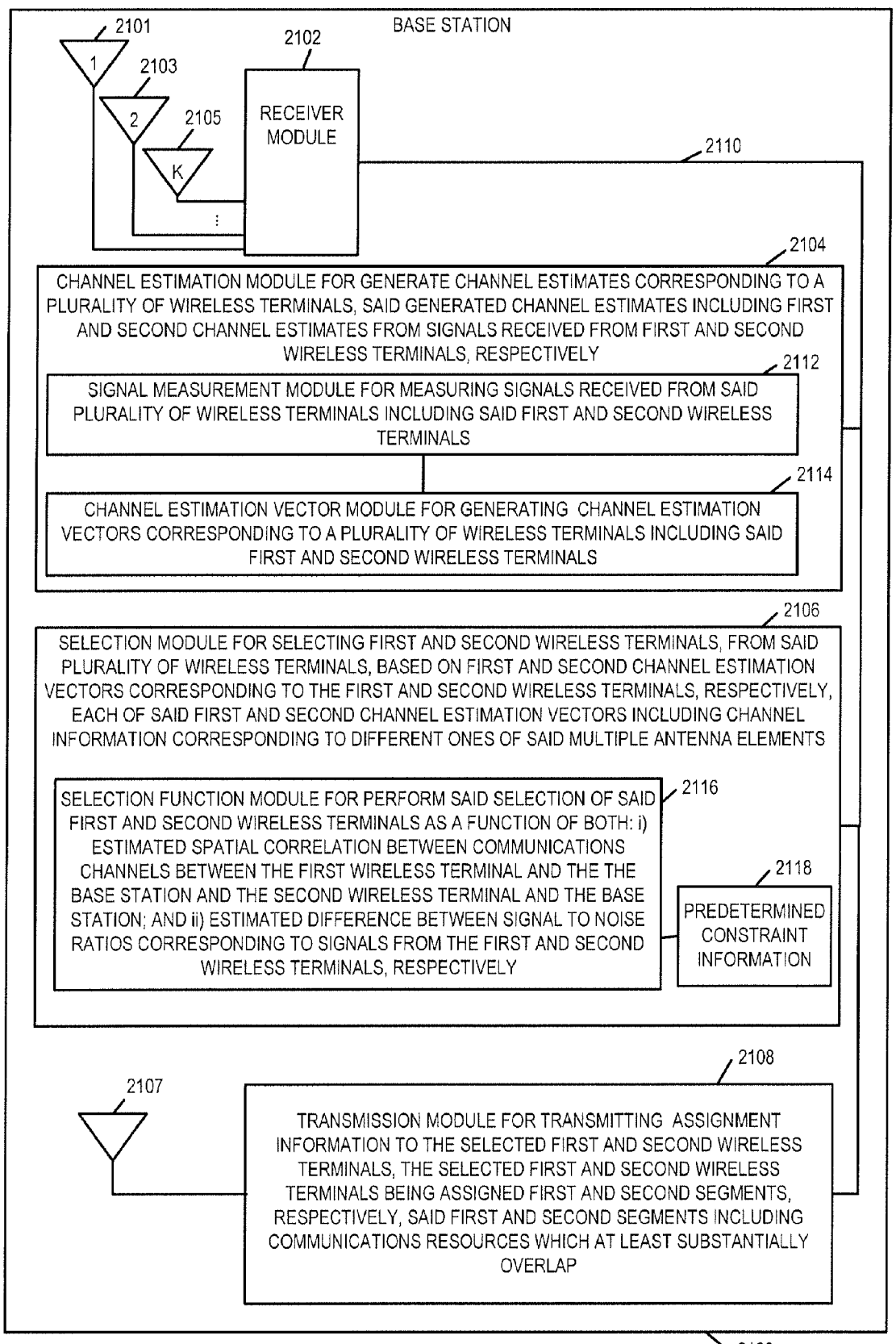
FIG. 21 is a drawing of an exemplary base station in accordance with various embodiments.

FIG. 21 is a drawing of an exemplary base station 2100 in accordance with various embodiments. Exemplary base station 2100 may implement the method of flowchart 2000 of FIG. 20. Exemplary base station 2100 includes a receiver module 2102, a channel estimation module 2104, a selection module 2106 and a transmission module 2108 coupled together via a bus 2110 via which the various elements can interchange data and information. Receiver module 2102, e.g., an OFDM receiver, receives uplink signals from a plurality of wireless terminals via receive antenna elements (receive antenna element 1 2101, receive antenna element 2 2103, . . . , receive antenna element k 2105).

Channel estimation module 2104 generates channel estimates corresponding to a plurality of wireless terminals, said generated channel estimates including first and second channel estimates from signals received from first and second wireless terminals, respectively. Channel estimation module 2104 includes a signal measurement module 2112 and a channel estimation vector module 2114. Signal measurement module 2112 measures signals received from said plurality of wireless terminals including signals received from said first and second wireless terminals. Channel estimation module 2114 generates channel estimation vectors corresponding to a plurality of wireless terminals including said first and second wireless terminals.

Selection module 2106 selects first and second wireless terminals, from said plurality of wireless terminals, based on first and second channel estimation vectors corresponding to the first and second wireless terminals, respectively, each of said first and second channel estimation vectors including channel estimation information corresponding to different ones of said multiple antenna elements. Selection module 2106 includes a selection function module 2116 and predetermined constraint information 2118. The selection function module 2116 performs said selection of said first and second wireless terminals as a function of both i) estimated spatial correlation between communications channels between the first wireless terminal and the base station and the second wireless terminal and the base station; and ii) estimated difference between signal to noise ratios corresponding to signals from the first and second wireless terminals, respectively. The predetermined constraint information 2118 is, e.g., a constraint which is satisfied when the selection module 2106 selects the first and second wireless terminals from said plurality of wireless terminals. The predetermined constraint information 2118 is, e.g., a function output limit which can be satisfied by different combinations of estimated spatial correlation and estimated differences between signal to noise ratios.

Transmission module 2108 is coupled to transmit antenna 2107, via which the base station transmits downlink signals to wireless terminals. Transmission module 2108 transmits assignment information to the selected first and second wireless terminals being assigned first and second segments, respectively, said first and second segments including communications resources which at least substantially overlap.

While described in the context of an OFDM system, the methods and apparatus of various embodiments, are applicable to a wide range of communications systems including many non-OFDM and/or non-cellular systems.

In various embodiments nodes described herein are implemented using one or more modules to perform the steps corresponding to one or more methods, for example, generation of a channel estimation vector, generation of a cross correlation coefficient, selection of wireless terminals for substantially overlapping segments, generation of assignment signals, control of power levels, control of SNR levels, etc. In some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s).

Numerous additional variations on the methods and apparatus described above will be apparent to those skilled in the art in view of the above descriptions. Such variations are to be considered within scope. The methods and apparatus of various embodiments may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of various embodiments.

What is claimed is:

1. A method of operating a base station including multiple antenna elements for use with a plurality of wireless terminals, the method comprising:
   selecting first and second wireless terminals, from said plurality of wireless terminals, based on first and second channel estimate vectors corresponding to said first and second wireless terminals, respectively, each of said first and second channel estimate vectors including channel information corresponding to different ones of said multiple antenna elements; and
   transmitting assignment information to the selected first and second wireless terminal, the selected first and second wireless terminals being assigned first and second segments, respectively, said first and second segments including communications resources which at least substantially overlap,
   wherein said selecting of the first and second wireless terminals is performed as a function of both:
   i) an estimated spatial correlation between communications channels between the first wireless terminal and the base station and the second wireless terminal and the base station; and
   ii) an estimated difference between signal to noise ratios corresponding to signals from the first and second wireless terminals, respectively.

2. The method of claim 1, wherein said first and second segments are sets of time-frequency resource units.

3. The method of claim 2, wherein said first and second segments are uplink traffic channel segments and wherein a time frequency resource unit is an OFDM tone-symbol.

4. The method of claim 2, wherein said first and second segments are downlink traffic channel segments and wherein a time frequency resource unit is an OFDM tone-symbol.

5. The method of claim 2 wherein at least 50% of the time-frequency resource units included in one of said first and second segments is included in the other of the first and second segments.

6. The method of claim 2 wherein 100% of the time-frequency resource units included in one of said first and second segments is included in the other of the first and second segments.

7. The method of claim 6 wherein the first and second segments include the same number of time-frequency resource units.

8. The method of claim 1, further comprising, prior to performing said selecting,
   generating said first and second channel estimates from signals received from said first and second wireless terminals, respectively.

9. The method of claim 8 wherein said channel estimates are generated by measuring signals received from said first and second wireless terminals.

10. The method of claim 9, further comprising:
    receiving signals from the first and second wireless terminals in the assigned first and second segments; and
    decoding the received signals corresponding to at least one of the first and second wireless terminals using one of said first and second channel estimate vectors corresponding to said at least one of the first and second wireless terminals.

11. The method of claim 10, the method further comprising:
    signaling the first and second wireless terminals to control their output power so that signals from said first and second wireless terminals are received at approximately equal average power per time-frequency unit at said base station.

12. The method of claim 11 wherein said signals from said first and second wireless terminals are received with received power levels within 3 dB of each other.

13. The method of claim 10, the method further comprising:
    signaling the first and second wireless terminals to control their output power so that signals from said first and second wireless terminals are received at approximately equal average signal to noise ratios.

14. The method of claim 13 wherein said approximately equal average signal to noise ratios are within 3 dBs of each other.

15. The method of claim 10, the method further comprising:
    signaling the first and second wireless terminals to control their output data rate so that signals from said first and second wireless terminals are received at approximately equal average signal to noise ratios at said base station.

16. The method of claim 15 wherein said approximately equal average signal to noise ratios are within 3 dB of each other.

17. The method of claim 8 wherein said channel estimates are generated from received information communicating channel information transmitted by said first and second wireless terminals.

18. The method of claim 17, further comprising:
    subjecting first and second signals to be transmitted corresponding to the first and second wireless terminals, respectively, to first and second transforms, respectively, each of the first and second transforms being generated from at least one of the first and second channel estimates; and
    transmitting encoded first and second signals to the first and second wireless terminals in the assigned first and second segments.

19. The method of claim 18, the method further comprising:
    controlling the transmission power of the first and second encoded signals so that the encoded signals are transmitted at approximately equal average power per time-frequency unit.

20. The method of claim 19 wherein said signals to said first and second wireless terminals are transmitted at transmission power levels within 3 dB of each other.

21. The method of claim 1, wherein said selecting the first and second wireless terminals includes:
    selecting wireless terminals having substantially orthogonal channel estimate vectors.

22. The method of claim 21, wherein said substantially orthogonal channel estimate vectors have a cross correlation coefficient having a magnitude less than 0.2.

23. The method of claim 1, wherein said selection selects said first and second wireless terminals from said plurality of wireless terminals to satisfy a predetermined constraint.

24. The method of claim 23, wherein said constraint is a function output limit which can be satisfied by different combinations of estimated spatial correlation and estimated differences between signal to noise ratios.

25. A method of operating a base station including multiple antenna elements for use with a plurality of wireless terminals, the method comprising:
- selecting first and second wireless terminals, from said plurality of wireless terminals, based on first and second channel estimate vectors corresponding to said first and second wireless terminals, respectively, each of said first and second channel estimate vectors including channel information corresponding to different ones of said multiple antenna elements;
- transmitting assignment information to the selected first and second wireless terminal, the selected first and second wireless terminals being assigned first and second segments, respectively, said first and second segments including communications resources which at least substantially overlap;
- assigning a third segment to a third wireless terminal, said third segment fully or substantially non-overlapping said first and second segments in frequency and at least partially overlapping in time; and
- transmitting a signal to said third wireless terminal to control the transmission power level of said third wireless terminal so that the received power level will be substantially different from the power level of signals received from said first and second wireless terminals.

26. The method of claim 25 wherein said received power level difference is at least 5 dB.

27. A method of operating a base station including multiple antenna elements for use with a plurality of wireless terminals, the method comprising:
- selecting first and second wireless terminals, from said plurality of wireless terminals, based on first and second channel estimate vectors corresponding to said first and second wireless terminals, respectively, each of said first and second channel estimate vectors including channel information corresponding to different ones of said multiple antenna elements;
- transmitting assignment information to the selected first and second wireless terminal, the selected first and second wireless terminals being assigned first and second segments, respectively, said first and second segments including communications resources which at least substantially overlap;
- assigning a third segment to a third wireless terminal, said third segment fully or substantially non-overlapping said first and second segments in frequency and at least partially overlapping in time; and
- transmitting a signal to said third wireless terminal using a transmission power level which is substantially different from the power level of signals transmitted to said first and second wireless terminals.

28. The method of claim 27, wherein said transmitted power level difference is at least 5 dB.

29. A base station for use with a plurality of wireless terminals, the base station comprising:
- multiple antenna elements for communicating with a wireless terminal;
- a selection module for selecting first and second wireless terminals, from said plurality of wireless terminals, based on first and second channel estimate vectors corresponding to said first and second wireless terminals, respectively, each of said first and second channel estimate vectors including channel information corresponding to different ones of said multiple antenna elements; and
- a transmission module for transmitting assignment information to the selected first and second wireless terminal, the selected first and second wireless terminals being assigned first and second segments, respectively, said first and second segments including communications resources which at least substantially overlap,
- wherein the selection module performs said selecting of the first and second wireless terminals as a function of both:
  - i) an estimated spatial correlation between communications channels between the first wireless terminal and the base station and the second wireless terminal and the base station; and
  - ii) an estimated difference between signal to noise ratios corresponding to signals from the first and second wireless terminals, respectively.

30. The base station of claim 29, wherein said first and second segments are sets of time-frequency resource units.

31. The base station of claim 30, wherein said first and second segments are uplink traffic channel segments and wherein a time frequency resource unit is an OFDM tone-symbol, the base station further comprising:
- stored information indicating which segments of a plurality of segments substantially overlap each other, said plurality of segments including said first and second segments.

32. The base station of claim 30, wherein said first and second segments are downlink traffic channel segments and wherein a time frequency resource unit is an OFDM tone-symbol, the base station further comprising:
- stored information indicating which segments of a plurality of segments substantially overlap each other, said plurality of segments including said first and second segments.

33. The base station of claim 30 wherein at least 50% of the time-frequency resource units included in one of said first and second segments is included in the other of the first and second segments.

34. The base station of claim 30 wherein 100% of the time-frequency resource units included in one of said first and second segments is included in the other of the first and second segments.

35. The base station of claim 34 wherein the first and second segments include the same number of time-frequency resource units.

36. The base station of claim 29, further comprising:
- a channel estimation generation module for generating said first and second channel estimates from signals received from said first and second wireless terminals, respectively.

37. The base station of claim 36 wherein said channel estimation generation module includes a measurement module for measuring signals received from said first and second wireless terminals.

38. The base station of claim 37, further comprising:
- a receiver for receiving signals from the first and second wireless terminals in the assigned first and second segments; and
- a decoder for decoding the received signals corresponding to at least one of the first and second wireless terminals using one of said first and second channel estimate vectors corresponding to said at least one of the first and second wireless terminals.

39. The base station of claim 38 further comprising:
- a wireless terminal power control module for signaling the first and second wireless terminals to control their output power so that signals from said first and second wireless terminals, corresponding to first and second segments, respectively, are received at approximately equal average power per time-frequency unit at said base station.

40. The base station of claim 39 wherein said signals from said first and second wireless terminals are received with received power levels within 3 dB of each other.

41. The base station of claim 38 further comprising:
a wireless terminal power control module for signaling the first and second wireless terminals to control their output power so that signals from said first and second wireless terminals, corresponding to first and second segments, respectively, are received at said base station having approximately equal average signal to noise ratios.

42. The base station of claim 41 wherein said approximately equal average signal to noise ratios are within 3 dB of each other.

43. The base station of claim 38 further comprising:
a wireless terminal control module for signaling the first and second wireless terminals to control their output data rate, corresponding to said first and second segments, respectively, so that signals from said first and second wireless terminals are received at said base station having approximately equal average signal to noise ratios.

44. The base station of claim 43 wherein said approximately equal average signal to noise ratios are within 3 dB of each other.

45. The base station of claim 36 wherein said channel estimation generation module includes a channel information recovery module for receiving information communicating channel information transmitted by said first and second wireless terminals.

46. The base station of claim 45, further comprising:
a transform module for subjecting first and second signals to be transmitted corresponding to the first and second wireless terminals, respectively, to first and second transforms, respectively, each of the first and second transforms being generated from at least one of the first and second channel estimates; and
wherein said transmission module transmits encoded first and second signals to the first and second wireless terminals in the assigned first and second segments.

47. The base station of claim 46, further comprising:
a power control module for controlling the transmission power of the first and second encoded signals so that the encoded signals are transmitted at approximately equal average power per time-frequency unit.

48. The base station of claim 47 wherein said signals to said first and second wireless terminals are transmitted at transmission power levels within 3 dB of each other.

49. The base station of claim 29, wherein said selection module selects the first and second wireless terminals as a function of channel estimate vector orthogonality information and wherein said first and second wireless terminals have substantially orthogonal channel estimate vectors.

50. The base station of claim 49, wherein said selection module includes:
a correlation module for determining a degree of orthogonality between a pair of channel estimation vectors.

51. The base station of claim 50, wherein said selection module further includes an orthogonality based screening module for identifying pairs of channel estimate vectors which satisfy a minimum orthogonality requirement.

52. The base station of claim 49, wherein said substantially orthogonal channel estimate vectors have a cross correlation coefficient having a magnitude less than 0.2.

53. A base station for use with a plurality of wireless terminals, the base station comprising:
multiple antenna elements for communicating with a wireless terminal;
a selection module for selecting first and second wireless terminals, from said plurality of wireless terminals, based on first and second channel estimate vectors corresponding to said first and second wireless terminals, respectively, each of said first and second channel estimate vectors including channel information corresponding to different ones of said multiple antenna elements;
a transmission module for transmitting assignment information to the selected first and second wireless terminal, the selected first and second wireless terminals being assigned first and second segments, respectively, said first and second segments including communications resources which at least substantially overlap; and
an assignment signaling module for generating an assignment signal for assigning a third segment to a third wireless terminal, said third segment fully or substantially non-overlapping said first and second segments in frequency and at least partially overlapping in time,
wherein said transmission module transmits a signal to said third wireless terminal to control the transmission power level of said third wireless terminal so that the received power level will be substantially different from the power level of signals received from said first and second wireless terminals.

54. The base station of claim 53 wherein said received power level difference is at least 5 dB.

55. A base station for use with a plurality of wireless terminals, the base station comprising:
multiple antenna elements for communicating with a wireless terminal;
a selection module for selecting first and second wireless terminals, from said plurality of wireless terminals, based on first and second channel estimate vectors corresponding to said first and second wireless terminals, respectively, each of said first and second channel estimate vectors including channel information corresponding to different ones of said multiple antenna elements;
a transmission module for transmitting assignment information to the selected first and second wireless terminal, the selected first and second wireless terminals being assigned first and second segments, respectively, said first and second segments including communications resources which at least substantially overlap; and
an assignment signaling module for generating an assignment signal assigning a third segment to a third wireless terminal, said third segment fully or substantially non-overlapping said first and second segments in frequency and at least partially overlapping in time,
wherein said transmission module transmits a signal to said third wireless terminal using a transmission power level which is substantially different from the power level of signals transmitted to said first and second wireless terminals.

56. The base station of claim 55, wherein said transmitted power level difference is at least 5 dB.

57. A base station for use with a plurality of wireless terminals, the base station comprising:
at least one of multiple electromagnetic wave radiation means and multiple electromagnetic wave reception means for communicating with a wireless terminal;
selection means for selecting first and second wireless terminals, from said plurality of wireless terminals, based on first and second channel estimate vectors corresponding to said first and second wireless terminals, respectively, each of said first and second channel estimate vectors including channel information corresponding to different ones of multiple antenna elements; and transmission means for transmitting assignment information to the selected first and second wireless terminal, the selected first and second wireless terminals being assigned first and second segments, respectively, said first and second segments including communications resources which at least substantially overlap, wherein the selection means performs said selecting of the first and second wireless terminals as a function of both:

i) an estimated spatial correlation between communications channels between the first wireless terminal and the base station and the second wireless terminal and the base station; and ii) an estimated difference between signal to noise ratios corresponding to signals from the first and second wireless terminals, respectively.

58. The base station of claim 57, wherein said first and second segments are sets of time-frequency resource units.

59. The base station of claim 58 wherein at least 50% of the time-frequency resource units included in one of said first and second segments is included in the other of the first and second segments.

60. The base station of claim 58 wherein 100% of the time-frequency resource units included in one of said first and second segments is included in the other of the first and second segments.

61. The base station of claim 57, further comprising:

means for generating channel estimates for generating said first and second channel estimate vectors from signals received from said first and second wireless terminals, respectively.

62. The base station of claim 61 wherein said means for generating channel estimates includes means for measuring signals received from said first and second wireless terminals.

63. The base station of claim 62 wherein said means for generating channel estimates includes means for recovering information for receiving information communicating channel information transmitted by said first and second wireless terminals.

64. The base station of claim 57, wherein said selection module includes:

means for determining a degree of orthogonality between a pair of channel estimation vectors.

65. A non-transitory computer readable medium embodying machine executable instruction for controlling a communications device to implement a method, the method comprising:

selecting first and second wireless terminals, from a plurality of wireless terminals, based on first and second channel estimate vectors corresponding to said first and second wireless terminals, respectively, each of said first and second channel estimate vectors including channel information corresponding to different ones of multiple antenna elements; and transmitting assignment information to the selected first and second wireless terminal, the selected first and second wireless terminals being assigned first and second segments, respectively, said first and second segments including communications resources which at least substantially overlap, wherein said selecting of the first and second wireless terminals is performed as a function of both:

i) an estimated spatial correlation between communications channels between the first wireless terminal and the base station and the second wireless terminal and the base station; and ii) an estimated difference between signal to noise ratios corresponding to signals from the first and second wireless terminals, respectively.

66. The computer readable medium of claim 65, wherein said first and second segments are sets of time-frequency resource units.

67. The computer readable medium of claim 66 wherein at least 50% of the time-frequency resource units included in one of said first and second segments is included in the other of the first and second segments.

68. The computer readable medium of claim 66 wherein 100% of the time-frequency resource units included in one of said first and second segments is included in the other of the first and second segments.

69. The computer readable medium of claim 68 wherein the first and second segments include the same number of time-frequency resource units.

70. The computer readable medium of claim 65, further embodying machine executable instructions for:

generating said first and second channel estimates from signals received from said first and second wireless terminals, respectively, prior to performing said selecting.

71. An apparatus comprising:

a processor configured to:

select first and second wireless terminals, from a plurality of wireless terminals, based on first and second channel estimate vectors corresponding to said first and second wireless terminals, respectively, each of said first and second channel estimate vectors including channel information corresponding to different ones of multiple antenna elements; and transmit assignment information to the selected first and second wireless terminal, the selected first and second wireless terminals being assigned first and second segments, respectively, said first and second segments including communications resources which at least substantially overlap, wherein the processor is configured to select the first and second wireless terminals as a function of both:

i) an estimated spatial correlation between communications channels between the first wireless terminal and the base station and the second wireless terminal and the base station; and ii) an estimated difference between signal to noise ratios corresponding to signals from the first and second wireless terminals, respectively.

72. The apparatus of claim 71, wherein said first and second segments are sets of time-frequency resource units.

73. The apparatus of claim 72 wherein at least 50% of the time-frequency resource units included in one of said first and second segments is included in the other of the first and second segments.

74. The apparatus of claim 72 wherein 100% of the time-frequency resource units included in one of said first and second segments is included in the other of the first and second segments.

75. The apparatus of claim 74 wherein the first and second segments include the same number of time-frequency resource units.

76. The apparatus of claim 71, wherein said processor is further configured to:

generate said first and second channel estimate vectors from signals received from said first and second wireless terminals, respectively, prior to performing said selecting.

* * * * *